US008750616B2

(12) United States Patent
Wu et al.

(10) Patent No.: US 8,750,616 B2
(45) Date of Patent: Jun. 10, 2014

(54) CHARACTER IMAGE EXTRACTING APPARATUS AND CHARACTER IMAGE EXTRACTING METHOD

(75) Inventors: Bo Wu, Shanghai (CN); Jianjun Dou, Shanghai (CN); Ning Le, Shanghai (CN); Yadong Wu, Shanghai (CN); Jing Jia, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 1576 days.

(21) Appl. No.: 11/963,613

(22) Filed: Dec. 21, 2007

(65) Prior Publication Data

US 2009/0028435 A1 Jan. 29, 2009

(30) Foreign Application Priority Data

Jul. 23, 2007 (CN) .......................... 2007 1 0129605

(51) Int. Cl.
*G06K 9/34* (2006.01)
(52) U.S. Cl.
USPC ........................... 382/177; 382/176; 382/190
(58) Field of Classification Search
CPC ... G06K 9/342; G06K 2209/01; G06K 9/346; G06K 9/34; G06K 9/348
USPC ......... 382/177, 176, 190, 254, 274, 187, 202, 382/199, 181, 102, 103, 270, 159, 173, 209, 382/237
See application file for complete search history.

(56) References Cited

U.S. PATENT DOCUMENTS

| | | | | |
|---|---|---|---|---|
| 5,410,611 A | * | 4/1995 | Huttenlocher et al. | 382/177 |
| 5,680,478 A | * | 10/1997 | Wang et al. | 382/176 |
| 5,761,344 A | * | 6/1998 | Al-Hussein | 382/237 |
| 5,768,414 A | * | 6/1998 | Jamali | 382/173 |
| 5,809,167 A | * | 9/1998 | Al-Hussein | 382/190 |
| 5,821,929 A | | 10/1998 | Shimizu et al. | |
| 5,892,843 A | * | 4/1999 | Zhou et al. | 382/176 |
| 6,577,763 B2 | * | 6/2003 | Fujimoto et al. | 382/199 |
| 6,826,305 B2 | * | 11/2004 | Zhu | 382/172 |
| 7,221,795 B2 | * | 5/2007 | Nakagawa | 382/176 |
| 7,657,120 B2 | * | 2/2010 | Aradhye | 382/290 |
| 7,715,628 B2 | * | 5/2010 | Jun et al. | 382/176 |
| 2005/0271275 A1 | * | 12/2005 | Chang | 382/176 |
| 2009/0112642 A1 | * | 4/2009 | Uekane et al. | 705/7 |

FOREIGN PATENT DOCUMENTS

| | | | | |
|---|---|---|---|---|
| JP | 4-17086 | | 1/1992 | |
| JP | 6-111064 | | 4/1994 | |
| JP | 08-153110 A | | 6/1996 | |
| JP | 8-305794 | | 11/1996 | |
| JP | 08-329080 A | | 12/1996 | |
| JP | 9-106437 | | 4/1997 | |
| JP | 09106437 | * | 4/1997 | G06K 9/34 |

(Continued)

*Primary Examiner* — Mekonen Bekele
(74) *Attorney, Agent, or Firm* — Birch, Stewart, Kolasch & Birch, LLP

(57) ABSTRACT

In an extracting step, the extracting portion obtains a linked component composed of a plurality of mutually linking pixels from a character string region composed of a plurality of characters, and extracts section elements from the character string region, the section elements each being surrounded by a circumscribing figure circumscribing to the linked component. In the first altering step, the first altering portion combines section elements at least having a mutually overlapping part among the extracted section elements so as to prepare a new section element. In the first selecting step, the first selecting portion determines a reference size in advance and selects section elements having a size greater than the reference size, from among the section elements altered in the first altering step.

4 Claims, 24 Drawing Sheets

(56) References Cited

FOREIGN PATENT DOCUMENTS

| JP | 09106437 A | * | 4/1997 | ............... G06K 9/34 |
| JP | 9-319747 A | | 12/1997 | |
| JP | 2000-090201 A | | 3/2000 | |
| JP | 2000-181994 A | | 6/2000 | |
| JP | 2002-157550 | | 5/2002 | |
| JP | 2002157550 A | * | 5/2002 | ............... G06K 9/20 |
| JP | 2002-245062 A | | 8/2002 | |

* cited by examiner

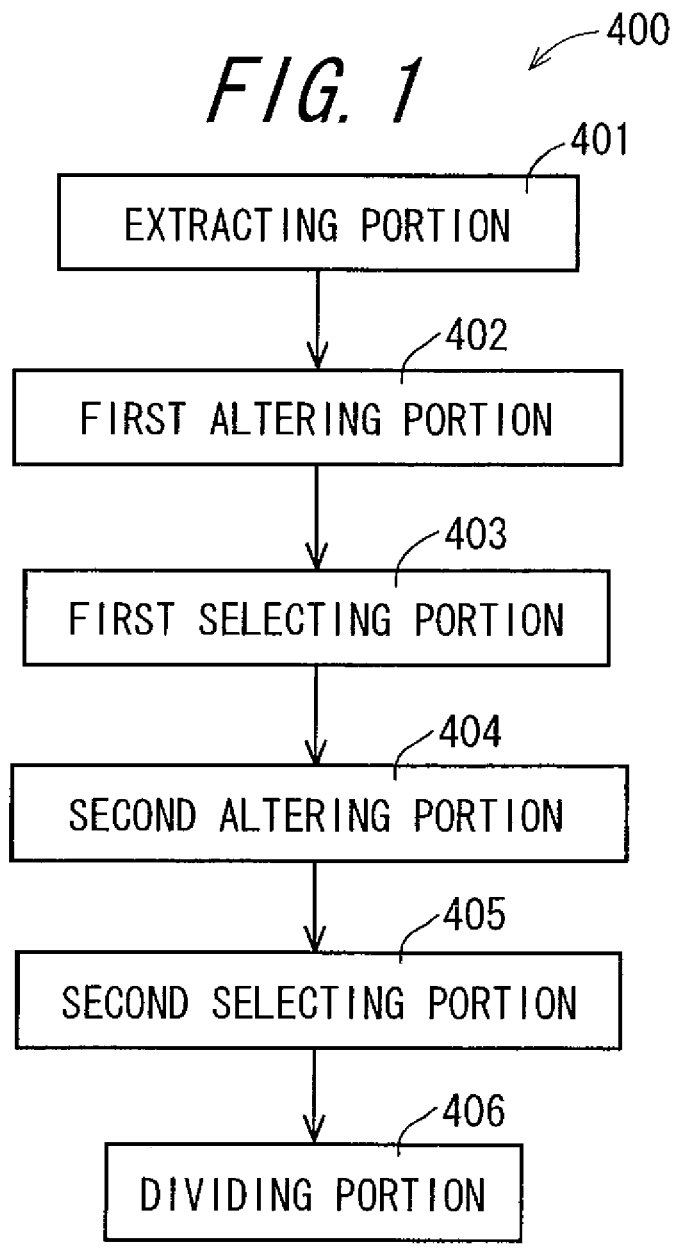

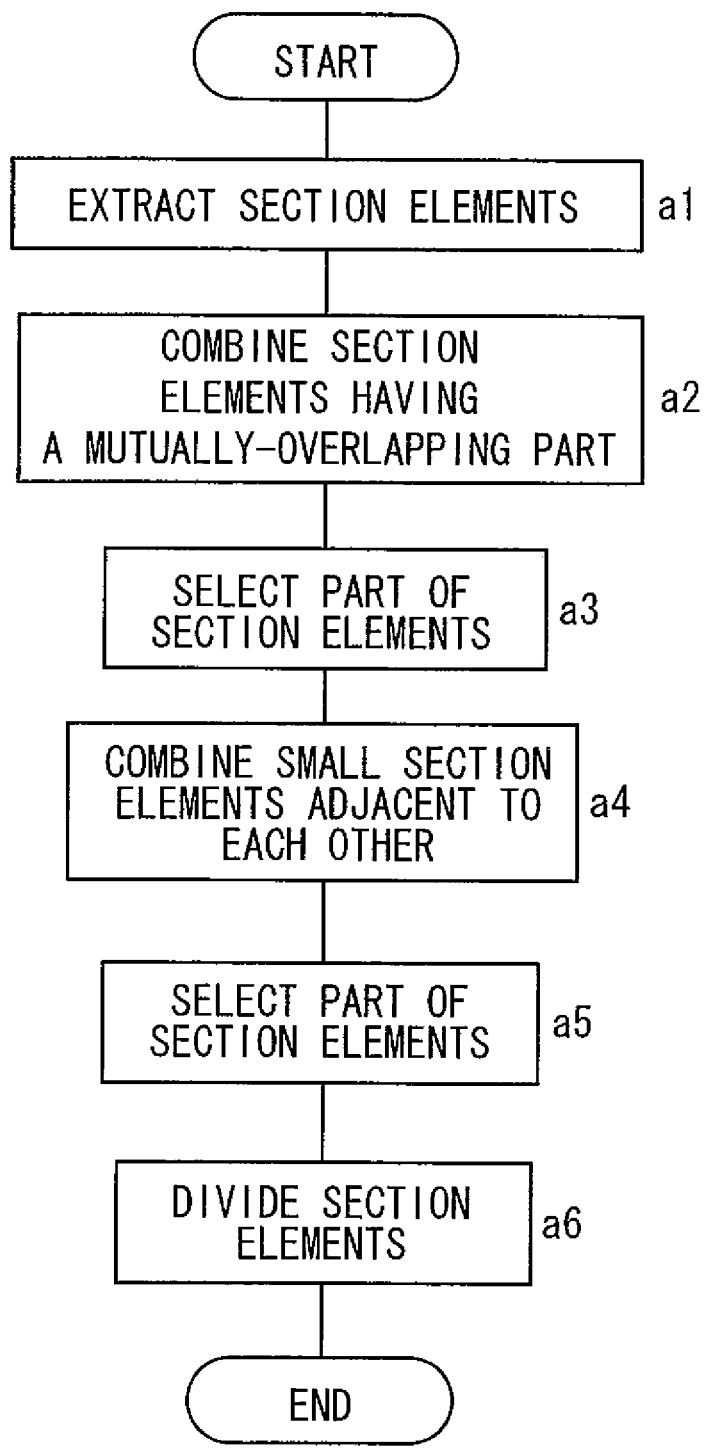

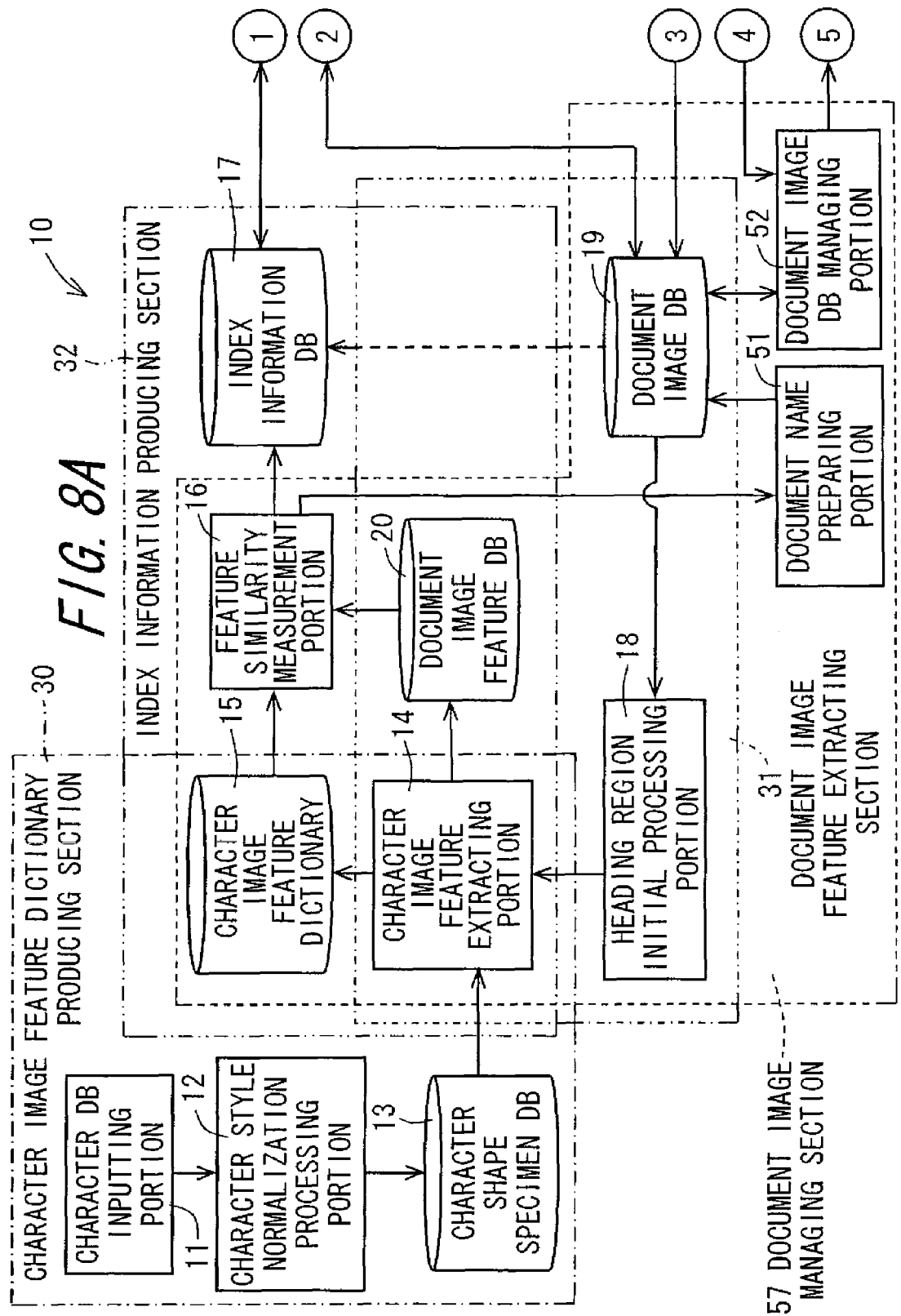

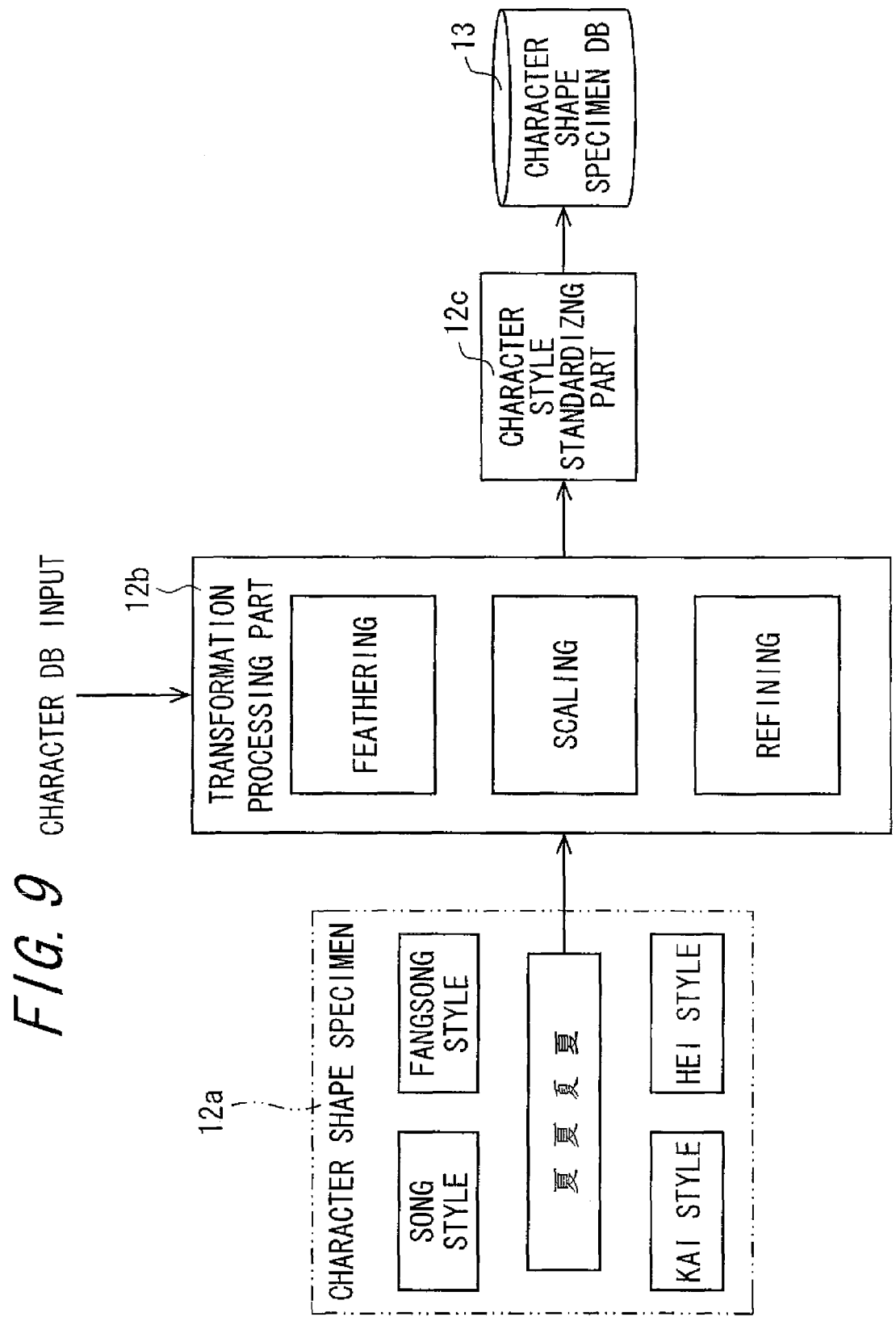

IF:
- SEARCH KEYWORD INCLUDES R PIECES OF CHARACTERS: C1, C2, ..., Cr;
- INDEX MATRIX HAS M×N CELLS, CORRELATION VALUE MATRIX "Weight" HAS M×N CELLS, AND Weight[i][j] REPRESENTS CORRELATION VALUE WHEN CHARACTER AT Index[i][j] IS IN SIMILARITY;
- DEGREE-OF-CORRELATION WEIGHTING FACTOR FOR ROWS IS REPRESENTED BY A SYMBOL Q; AND
- CORRELATION VALUES ARE REPRESENTED BY W1, W2, ..., Wr WHEN CHARACTER IS IN SIMILARITY.

\+

102

IF:
RESPECTIVE CHARACTERS C1, C2, ..., Cr, ARE MATCHED AT
[C1i, C1j], [C2i, C2j], ..., [Cri, Crj] IN INDEX MATRIX;
AND
C(k+1)i=Cki+1, C(m+1)i=Cmi+1 (m>k)    ... (1)

=

103

THEN:
- DEGREE OF CORRELATION BETWEEN SEARCH KEY WORD AND INDEX MATRIX IS EXPRESSED BY:
SimDegree=W1+W2+···+W(k−1)+Q*(Wk+W(k+1))+···+W(m−1)+Q*(Wm+W(m+1))+···+Wr  ... (2)
WHERE W1=Weight[C1i][C1j], W2=Weight[C2i][C2j], ..., Wr=Weight[Cri][Crj]

104
FOR EXAMPLE,
-CORRELATION VALUE MATRIX "Weight" HAS M×N CELLS;
-Weight[i]=[1, 1-1/N, 1-2/N, ⋯, 1/N] (i=0, 1, ⋯, M-1);
 AND
-DEGREE-OF-CORRELATION WEIGHTING FACTOR FOR ROWS Q IS SET.

↓ "神仙"

105
RESULT:
CORRELATION VALUE OF "神" IS (1-1/N)
CORRELATION VALUE OF "仙" IS (1)

↓ WEIGHT ADJUSTMENT

106
RESULT:
DEGREE OF CORRELATION BETWEEN "神仙" AND "KA" IS
DETERMINED BY SimDegree=((1-1/N)+1)*Q

| ROW\COLUMN | | 1 | 2 | 3 | · · · | N |
|---|---|---|---|---|---|---|
| 去 | 1 | 去 | 丢 | 云 | · · · | 无 |
| 神 | 2 | 伸 | 神 | 绅 | · · · | 砷 |
| 仙 | 3 | 仙 | 灿 | 伙 | · · · | 伏 |
| 居 | 4 | 居 | 屑 | 房 | · · · | 厉 |
| 住 | 5 | 任 | 佳 | 住 | · · · | 仁 |
| 的 | 6 | 酌 | 的 | 卤 | · · · | 盯 |
| 地 | 7 | 地 | 沌 | 泡 | · · · | 拖 |
| 方 | 8 | 方 | 万 | 芳 | · · · | 仿 |

109

LANGUAGE MODEL 61

— LEXICAL ANALYSIS METHOD

| ROW\COLUMN | | 1 | 2 | 3 | · · · | N |
|---|---|---|---|---|---|---|
| 去 | 1 | 去 | 丢 | 云 | · · · | 无 |
| 神 | 2 | 神 | 伸 | 绅 | · · · | 砷 |
| 仙 | 3 | 仙 | 灿 | 伙 | · · · | 伏 |
| 居 | 4 | 居 | 屑 | 房 | · · · | 厉 |
| 住 | 5 | 住 | 佳 | 任 | · · · | 仁 |
| 的 | 6 | 的 | 酌 | 卤 | · · · | 盯 |
| 地 | 7 | 地 | 沌 | 泡 | · · · | 拖 |
| 方 | 8 | 方 | 万 | 芳 | · · · | 仿 |

110

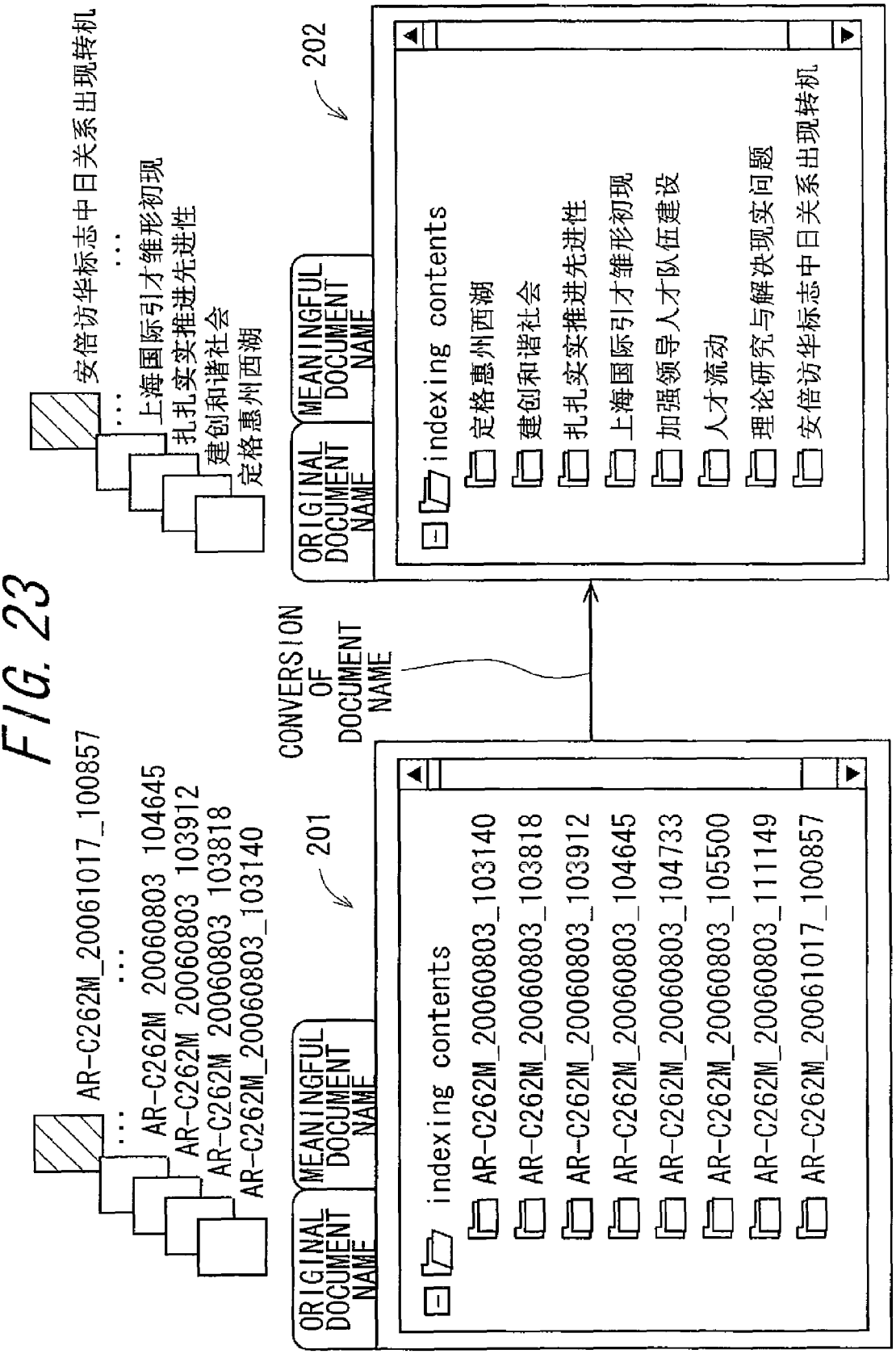

CHARACTER IMAGE EXTRACTING APPARATUS AND CHARACTER IMAGE EXTRACTING METHOD

CROSS-REFERENCE TO RELATED APPLICATION

This application claims priority to Chinese Patent Application No. 200710129605.0, which was filed on Jul. 23, 2007, the contents of which are incorporated herein by reference in its entirety.

BACKGROUND OF THE INVENTION

1. Field of the Invention

The present invention relates to a character image extracting apparatus and a character image extracting method for extracting an image of each of characters from a character string region composed of a plurality of characters.

Further, the present invention relates to a character image extracting program and a recording medium which are adapted to extract an image of each of characters from a character string region composed of a plurality of characters.

2. Description of the Related Art

A document filing apparatus has been put into practical use. In the document filing apparatus, a document can be held in a document data base which can be then searched for the document (for example, refer to Japanese Unexamined Patent Publication JP-A 2002-245062). Some document filing apparatuses utilize an image inputting device such as an image scanner to convert a document into an image and electronically store the document image, and enables searching of the document image later on. In such a document filing apparatus as has been described, it is necessary to extract images of respective characters from a character string region of the document image, so as to allow for the subsequent search.

Except for characters, the character string region may often include punctuation marks such as periods and also noise parts. The punctuation marks and the noise parts are not necessary for searching. A conventional document filing apparatus, however, extracts not only an element including characters, but also an element including punctuation marks and an element including noise parts undesirably, in extracting images of respective characters from a character string region.

SUMMARY OF THE INVENTION

An object of the present invention is to provide a character image extracting method and apparatus capable of extracting images of respective characters accurately from a character string region composed of a plurality of characters.

The invention provides a character image extracting method comprising:

an extracting step for obtaining a linked component composed of a plurality of mutually linking pixels from a character string region composed of a plurality of characters and extracting section elements from the character string region, the section elements each being surrounded by a circumscribing figure circumscribing to the linked component;

an altering step for altering the section elements extracted in the extracting step, a new section element being formed by combining section elements at least having a mutually overlapping part among the section elements extracted in the extracting step, while remaining section elements thereof being set as new section elements without being altered; and a selecting step for selecting, from among the section elements altered in the altering step, section elements having a size greater than a predetermined reference size.

According to the invention, in the extracting step, the section elements are extracted from a character string region composed of a plurality of characters. In the altering step, the section elements extracted by the extracting step are altered. In the selecting step, the section elements altered by the altering step are partially selected.

In the extracting step, from the character string region, a linked component is determined, that is composed of a plurality of mutually linking pixels. And further, section elements are extracted, that are circumscribing by a circumscribing figure circumscribing to the linked component. The section elements include both elements including the character entirety and elements including a part of the character. Moreover, the section elements also include elements including punctuation marks. The punctuation marks refer to description symbols including full-stop symbols, grouping symbols, and middle-dot symbols, and the like. Further, the section elements also comprise elements including noise parts which belong to neither the characters nor the punctuation marks.

In the altering step, the section elements are combined, that at least have a mutually-overlapping part. In this way, a new section element is formed by the combination. By doing so, for a certain character, it is possible to obtain one common element including the character entirety, by combining elements including a part of the character and elements including another part of the character. Moreover, for a certain character, it is possible to obtain one element including the character entirety, by combining elements including a part of the character and elements including the character entirety.

In addition, in the altering step, the remaining section elements are adopted directly as new section elements without being altered. This can prevent elements including punctuation marks and elements including noise parts from being combined undesirably with each other so as not to form a large element. Consequently, elements including punctuation marks and elements including noise parts can be prevented from being selected undesirably in the selecting step which will be described later.

The elements including characters are greater in size than the elements including punctuation marks and the elements including noise parts. Making use of this feature, in the selecting step, the reference size is set in advance, and of the elements altered in the altering step, the section elements are selected that have a size greater than the reference size. In this way, this enables the elements including characters to be selected from the section elements altered in the altering step. In other words, this makes it possible to exclude the elements including punctuation marks and the element including noise parts from the section elements altered in the altering step.

In the invention as has been described heretofore, the extracting step, the altering step, and the selecting step are performed in the order just stated, thereby allowing for extraction of the elements including characters without extracting faultily the elements including punctuation marks and the elements including noise parts from the character string region. As a result, the element including characters can be extracted as character images with a higher degree of accuracy from the character string region.

Further, in the invention, it is preferable that the character image extracting method further comprises:

a second altering step for altering the section elements selected in the selecting step, in the second altering step, of the section elements selected by the selecting step, section elements that are smaller in dimension in a character alignment direction than a predetermined first reference dimension and that are adjacent to each other in the character alignment direction, are combined with each other to form a new section element while remaining section elements thereof are set as new section elements without being altered; and a second selecting step for selecting, of the section elements altered by the second altering step, section elements that are greater in dimension in a character alignment direction than a predetermined second reference dimension.

Further, according to the invention, in the second altering step, the section elements selected in the selecting step are altered. In the second selecting step, a part of the section elements altered in the second selecting step is selected.

The sizes of the characters in character string region may be different from each other. In this case, there is a high possibility that a plurality of elements including relatively small characters are adjacent in the character alignment direction thereof. However, it happens rarely that elements including punctuation marks are adjacent in the character alignment direction thereof. In addition, it also happens rarely that elements including noise parts are adjacent in the character alignment direction thereof.

Making use of this feature, in the second altering step, the first reference dimension is determined in advance, and of the section elements selected in the selecting step, the elements that are less in dimension than the first reference dimension and that are adjacent in the character alignment direction thereof, are combined with each other. And a new section element is formed correspondingly by the combination. In this way, this enables a large element to be formed by combining the elements including relatively small characters. Accordingly, elements including relatively small characters can be prevented from being undesirably excluded in the second selecting step which will be described later on.

In addition, in the second altering step, the remaining section elements are adopted directly as new section elements without modification. In this way, the elements including punctuation marks and the elements including noise parts can be prevented from being combined undesirably with each other so as not to form a large element. Accordingly, this secures the exclusion of the elements including punctuation marks and the elements including noise parts in the second selecting step. The second selecting step will be described hereinbelow.

In the second selecting step, the second reference dimension is determined in advance, and of the section elements altered in the second altering step, the section elements are selected that are greater in dimension in the character alignment direction than the second reference dimension. By doing so, the elements including characters can be selected from the section elements altered in the second altering step. In other words, it is possible to exclude the elements including punctuation marks and the elements including noise parts from the section elements altered in the second altering step.

In the invention as has been described heretofore, the second altering step and the second selecting step are further performed in the order just stated, thereby preventing as feasible as possible the elements including punctuation marks and the elements including noise parts from being faultily extracted from the character string region, which allows for unfailing extraction of the elements including characters from the character string region. As a result, the element including characters can be extracted as character images with a far higher degree of accuracy from the character string region.

Further, in the invention, it is preferable that the character image extracting method further comprises:

a dividing step for diving, of the section elements selected in the second selecting step, section elements that are greater in dimension in the character alignment direction than a predetermined third reference dimension, based on the third reference dimension.

Further, according to the invention, when the section elements are extracted in the extracting step, a plurality of characters adjacent in the character alignment direction thereof may be included in one section element undesirably. Moreover, when the section elements are altered in the altering step and further when the section elements are altered in the second altering step, a plurality of characters adjacent in the character alignment direction thereof may be included in one section element. Consequently, in the dividing step, the third reference dimension is determined in advance, and of the section elements selected in the second selecting step, the section elements that are greater in dimension in the character alignment direction than the third reference dimension are divided on the basis of the third reference dimension. In this way, one section element can be prevented from including a plurality of characters. In other words, the respective character images can be extracted for each of characters.

Further, the invention provides a character image extracting apparatus comprising:

an extracting portion for obtaining a linked component composed of a plurality of mutually linking pixels from a character string region composed of a plurality of characters and extracting section elements from the character string region, the section elements each being surrounded by a circumscribing figure circumscribing to the linked component;

an altering portion for altering the section elements extracted by the extracting portion, a new section element being formed by combining section elements at least having a mutually overlapping part among the selection elements extracted by the extracting portion, and setting remaining section elements thereof as new section elements without being altered; and a selecting portion for selecting, from among the section elements altered by the altering portion, section elements having a size greater than a predetermined reference size.

According to the invention, the extracting portion extracts section elements from the character string region composed of a plurality of character images. The altering portion alters the section elements extracted by the extracting portion. The selecting portion selects a part of the section elements altered by the altering portion.

In the extracting portion, from the character string region, the linked component is determined, that is composed of a plurality of mutually linking pixels. And further, the section elements are extracted that are circumscribing by the circumscribing figure circumscribing to the linked component. The section elements include both elements including character entirety and elements including a part of the character. Moreover, the section elements also include elements including punctuation marks. Further, the section elements also include elements including noise parts which belong to neither the characters nor the punctuation marks.

In the altering portion, the section elements are combined, that at least have a mutually-overlapping part. In this way, a new section element is formed by the combination. By doing so, for a certain character, it is possible to obtain one common element including the character entirety, by combining elements including a part of the character and elements including another part of the character. Moreover, for a certain character, it is possible to obtain one element including the character entirety, by combining elements including a part of the character and elements including the character entirety.

In addition, in the altering portion, the remaining section elements are adopted directly as the new section elements without being altered. This can prevent the elements including punctuation marks and the elements including noise parts from being combined undesirably with each other so as not to form a large element. Consequently, the elements including punctuation marks and the elements including noise parts can be prevented from being selected undesirably by the selecting portion which will be described later on.

The elements including characters are greater in size than the elements including punctuation marks and the elements including noise parts. Making use of this feature, the selecting portion sets the reference size in advance, and of the elements altered by the altering portion, the selecting portion selects the section elements that have a size greater than the reference size. In this way, this enables the elements including characters to be selected from the section elements altered by the altering portion. In other words, this makes it possible to exclude the elements including punctuation marks and the element including noise parts from the section elements altered by the altering portion.

In the invention as has been described heretofore, the extracting portion, the altering portion, and the selecting portion respectively function, thereby allowing for extraction of the elements including characters without extracting faultily the elements including punctuation marks and the elements including noise parts from the character string region. As a result, the element including characters can be extracted as character images with a higher degree of accuracy from the character string region.

Further, the invention provides a character image extracting program for causing a computer to perform the character image extracting method.

Further, the invention provides a computer-readable recording medium on which is recorded a character image extracting program for causing a computer to perform the character image extracting method.

Further, according to the invention, it is possible to provide the character image extracting program and the computer-readable recording medium on which the character image extracting program is recorded.

BRIEF DESCRIPTION OF THE DRAWINGS

Other and further objects, features, and advantages of the invention will be more explicit from the following detailed description taken with reference to the drawings wherein:

FIG. 1 is a block diagram showing a constitution of a character image extracting apparatus for implementing a character image extracting method, according to one embodiment of the invention;

FIG. 2 is a flowchart of assistance in explaining the character image extracting method implemented by use of the character image extracting apparatus;

FIGS. 8A and 8B are block diagrams showing in detail the constitution of the document image processing apparatus;

FIG. 9 is an illustration showing a process on how to prepare a character shape specimen database;

FIG. 18 is an illustration showing a method of calculating a degree of correlation between a search keyword and an index matrix;

FIG. 19 is an illustration showing a specific example on how to calculate the degree of correlation between the search keyword and the index matrix;

FIG. 23 is an illustration showing browsing screens, displayed by a document image displaying portion, of a document image stored in a document image DB.

DETAILED DESCRIPTION

Figure 3A:
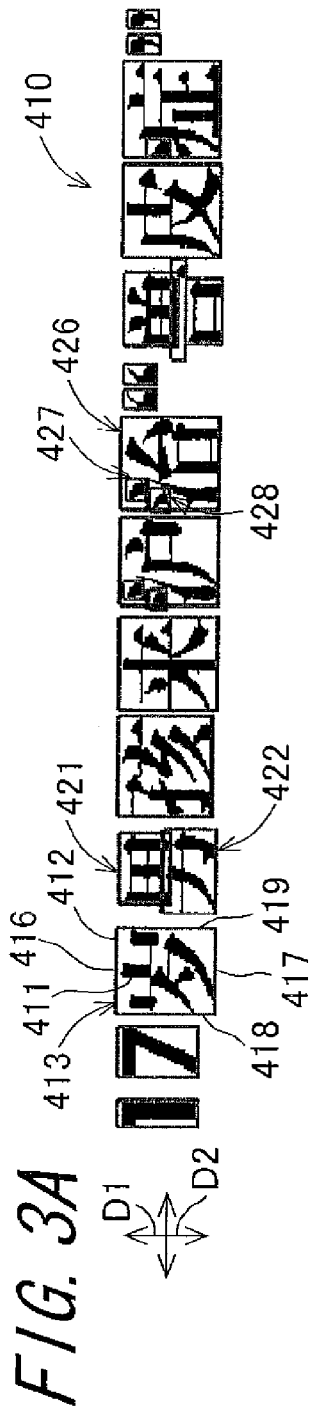
FIGS. 3A to 3D are views of assistance in explaining in detail an extracting step, the first altering step, the first selecting step, and the second altering step.

Now referring to the drawings, preferred embodiments of the invention are described below.

FIG. 1 is a block diagram showing a constitution of a character image extracting apparatus 400 for implementing a character image extracting method according to one embodiment of the invention. The character image extracting apparatus 400 constitutes a part of a document image processing apparatus 10 which inputs a document as an image and stores the image. The character image extracting apparatus 400 is employed to extract images of respective characters, from a heading region which is a character string region having a plurality of aligned characters.

In the character string region, the plurality of characters are aligned in a width-wise direction of character or in a height-wise direction of character. The width-wise direction of character refers to a direction of characters, which is orthogonal to a character orientation. The height-wise direction of character refers to a direction of characters, which is parallel to the character orientation. In other words, a character alignment direction is identical with the width-wise direction of character or the height-wise direction of character. Further, in other words, the characters are written horizontally or vertically. In the present embodiment, descriptions are given assuming that the characters are written horizontally. The characters are aligned in a line from left to right, and the character string region is composed of binary images.

The character image extracting apparatus 400 includes an extracting portion 401, the first altering portion 402, the first selecting portion 403, the second altering portion 404, the second selecting portion 405, and a dividing portion 406. The extracting portion 401 extracts section elements from the character string region. The first altering portion 402 is an altering portion for altering the section elements extracted by the extracting portion 401. The first selecting portion 403 is a selecting portion for selecting partially the section elements altered by the first altering portion 402. The second altering portion 404 is another altering portion for altering the section elements selected by the first selecting portion 403. The second selecting portion 405 is another selecting portion for selecting partially the section elements altered by the second altering portion 404. And, the dividing portion 406 divides the section elements selected by the second selecting portion 405.

FIG. 2 is a flowchart of assistance in explaining a character image extracting method implemented by use of the character image extracting apparatus 400. When a character string is provided, a process of extracting character images is started. The process consists of six steps. Step a1 is performed firstly serving as an extracting step. In the extracting step, the extracting portion 401 extracts section elements from the character string region.

In the following Step a2, an altering step is performed serving as the first altering step. In the first altering step, the first altering portion 402 alters the section elements extracted by the extracting portion 401. In the following Step a3, a selecting step is performed serving as the first selecting step. In the first selecting step, the first selecting portion 403 selects partially the section elements altered by the first altering portion 402.

In the following Step a4, another altering step is performed serving as the second altering step. In the second altering step, the second altering portion 404 alters the section elements selected by the first selecting portion 403. In the following Step a5, another selecting step is performed serving as the second selecting step. In the second selecting step, the second selecting portion 405 selects partially the section elements altered by the second altering portion 404.

In the following Step a6, a dividing step is performed. In the dividing step, the dividing portion 406 divides the section elements selected by the second selecting portion 405. After the dividing step has been performed, the process of extracting character images is completed.

Figure 3B:
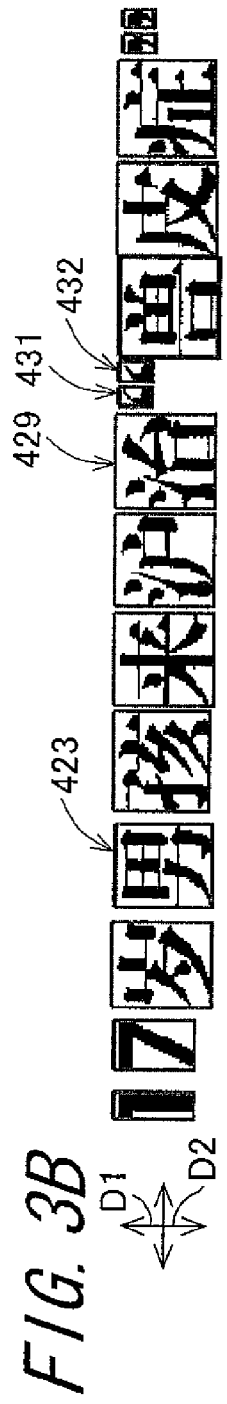
Figure 3C:
Figure 3D:

FIGS. 3A to 3D are views of assistance in explaining in detail the extracting step, the first altering step, the first selecting step, and the second altering step. FIG. 3A shows the respective section elements extracted by the extracting step. FIG. 3B shows the respective section elements altered by the first altering step. FIG. 3C shows the respective section elements selected by the first selecting step. FIG. 3D shows the respective section elements altered by the second altering step.

In the extracting step, from the character string region 410, the extracting portion 401 determines a linked component 411 composed of a plurality of mutually linking pixels. Further, the extracting portion 410 extracts, from the character string region 410, a section element 413 sectioned by a circumscribing FIG. 412 circumscribing to the linked component 411. As shown in FIG. 3A, the respective section elements are extracted in the extracting step.

The linked component 411 is composed of pixels which are linking with each other and which have the same pixel value. When the linked component 11 is determined, the connectivity may be regarded to be eight-connected or four-connected. In the embodiment, the linked component 411 is determined from left to right in the character string region 410, in consideration of that the characters are aligned in a line from left to right in the character string region 410.

The circumscribing FIG. 412 is rectangular, which is constructed of two sides 416 and 417 parallel to a character width-wise direction D1 and two sides 418 and 419 parallel to a character height-wise direction D2. A section element 413 is an inside part of the circumscribing FIG. 412 as has been mentioned heretofore. The section elements comprise elements including the character entirety and elements including a part of character. Moreover, the section elements comprise elements including punctuation marks. Further, the section elements also comprise elements including noise parts. The noise parts belong to neither the characters nor the punctuation marks.

The punctuation marks refer to description symbols, including full-stop symbols, grouping symbols, middle-dot symbols, and the like. The full-stop symbols are marks indicating an end of a sentence or a text. For example, the full-stop symbols include periods. The grouping symbols include beginning grouping symbols and ending grouping symbols, both of which belong to symbols that are used to surround a certain part in a text so as to discriminate clearly the certain part from the other parts. The beginning grouping symbols which indicate the beginning of a delimitated part, include, for example, double quotation marks. In contrast, the ending grouping symbols which indicate the ending of the delimitated part, include, for example, closed double quotation marks. The ending grouping symbols also include symbols indicating a pause in a sentence, for example, commas. The middle-dot symbols are marks, which are used at a break of a text or a phrase and which are positioned centrally in the width of the character. The middle-dot symbols include, for example, colons.

In the first altering step, the first altering portion 402 combines, of the section elements extracted by the extracting portion 401, the section elements at least having a mutually-overlapping part. A new element is formed correspondingly by the combination. The remaining-section elements are adopted directly as new section elements without modification. As shown in FIG. 3B, the respective new section elements are obtained in the first altering step.

Of the new section elements, the section elements are combined that at least have a mutually-overlapping part. The resulting elements are sectioned by a circumscribing figure circumscribing to the mutually-overlapping elements. The circumscribing figure is also rectangular, which is constructed of two sides parallel to the character width-wise direction and two sides parallel to the character height-wise direction.

In the first altering step as has been described above, the section elements are combined that at least have a mutually-overlapping part. And then, a new section element is formed correspondingly. By doing so, for a certain character, one element including the character entirety can be obtained by combining elements including a part of the character and elements including another part of the character. Moreover, for a certain character, one element including the character entirety can be obtained by combining elements including a part of the character and elements including the character entirety.

Take a character "男" as an example. As shown in FIG. 3A, two section elements 421 and 422 are extracted in the extracting step. Of the two section elements, one is the element 421 including a part of the character and the other one is the element 422 including another part of the character. As shown in FIG. 3B, one section element 423 can be obtained by combining the two elements 421 and 422 in the first altering step.

Further, take a character "治" as another example. As shown in FIG. 3A, three section elements 426, 427, and 428 are extracted in the extracting step. Of the three elements, one is the element 426 including the character entirety, another one is the element 427 including a part of the character, and the rest one is the element 428 including another part of the character. In the first altering step, as shown in FIG. 3B, one new section element 429 can be obtained by combining the three elements 426, 427, and 428.

In addition, in the first altering step, the remaining section elements are adopted directly as new section elements without modification. In this way, elements including punctuation marks and elements including noise parts can be prevented from being combined undesirably with each other so as not to form a large element. Accordingly, the elements including punctuation marks and the elements including noise parts can be prevented from being selected undesirably in the first selecting step and the second selecting step. The first selecting step and the second selecting step will be described later on.

In the embodiment, the section elements are combined, that at least have mutually-overlapping part in the character height-wise direction D2. In other words, section elements are not combined, that have a mutually-overlapping part in the character width-wise direction D1 but do not have a mutually-overlapping part in the character height-wise direction D2. Accordingly, this can prevent as feasible as possible a large element from being formed by combining undesirably the elements including punctuation marks and the elements including noise parts. As a result, the elements including punctuation marks and the elements including noise parts can be prevented as feasible as possible from being selected undesirably in the later-described first selecting step and second selecting step.

In the first selecting step, the first selecting portion 403 determines a reference size in advance, and selects, of the section elements altered by the first altering portion 402, section elements having a size greater than the reference size. As shown in FIG. 3C, respective section elements are selected in the first selecting step.

The elements including characters are greater in size than the elements including punctuation marks and the elements including noise parts. Making use of this feature, from the section elements altered by the first altering portion 402, section elements are selected that have a size greater than the reference size. In this way, the elements including characters can be selected from the section elements altered by the first altering portion 402. In other words, this can exclude the elements including punctuation symbols and the elements including noise parts, from the section elements altered by the first altering portion 402. For example, elements 431 and 432 including the double quotation marks are excluded by the first selecting step.

The aforementioned reference size is set based on a dimension of character string region when viewed in a direction orthogonal to the character alignment direction, or based on the size of the section elements altered by the first altering portion 402. Accordingly, the aforementioned size can be set appropriately. When the reference size is too small, there appears a problem of failing to exclude the elements including punctuation marks or noise parts. Contrarily, when the reference size is too large, there appears a problem of excluding even the elements including characters. By setting the reference size appropriately, the aforementioned problems can be prevented from occurring.

To be specific, a D1-related dimension (hereinafter, referred to as the "width-wise dimension") and a D2-related dimension (hereinafter, referred to as the "height-wise dimension") of the section elements are adopted to represent the size of the section elements in the first selecting step. The reference width-wise dimension and the reference height-wise dimension are adopted as the aforementioned reference size.

Depending on a character, either of a width-wise dimension and a height-wise dimension of an element including the character may be unequal to the reference dimension. Consequently, the section elements are excluded in the first selecting step, the width-wise dimensions of which are less than the reference width-wise dimension and the height-wise dimensions of which are less than the reference height-wise dimension. Moreover, the remaining section elements are selected by the first selecting step. As a result, this makes it possible to prevent the elements including characters from being excluded undesirably.

The reference width-wise dimension and the reference height-wise dimension are dimensions related to a direction orthogonal to the character alignment direction of the character string region. In the present embodiment, both of the reference dimensions are determined on the basis of the height-wise dimension of the character string region. By doing so, the reference width-wise dimension and the reference height-wise direction can be determined appropriately, despite of variation in the sizes of the respective section elements.

To be specific, the reference width-wise dimension and the reference height-wise dimension are set at values calculated by multiplying the height-wise dimension of the character string region by a predetermined ratio. Here, the predetermined ratio is greater than 0 and less than 1. The reference width-wise dimension and the reference height-wise dimension are selected to be, for example, 50% of the height-wise dimension of the character string region.

The reference width-wise dimension and the reference height-wise dimension may be determined according to other methods. For example, the reference width-wise dimension may be set at a value, which is calculated by multiplying an average value of width-wise dimension of the respective section elements by a predetermined ratio. In addition, the reference height-wise dimension may be set at a value, which is calculated by multiplying an average value of height-wise dimension of the respective section elements by a predetermined ratio.

In the first selecting step, it may be determined whether or not a section element is selected, on the basis of a diagonal dimension of the section element. In addition, it may be determined whether or not a section element is selected, on the basis of an area of the section element.

Further, in the first selecting step, it may be determined whether or not a section element is selected, on the basis of position information of the section element. In this case, the section elements are excluded, which are positioned too high or too low compared with the other section elements and further the sizes of which are less than the reference size. The remaining section elements are selected by the first selecting step. In addition, in this case, when it is determined that a section element aligned at both ends of the character alignment direction is separated from the other section elements, the section element is also excluded.

The elements including characters can be extracted accurately from the character string region as character images, by performing the extracting step, the first altering step, and the first selecting step as have been described heretofore. In other words, the elements including characters can be extracted without extracting faultily the elements including punctuation marks and the elements including noise parts.

In the second altering step, the second altering portion 404 determines the first reference dimension in advance. Of the section elements selected by the first selecting portion 403, the section elements are combined, the dimensions of which in the character alignment direction are less than the aforementioned first reference dimension and which are adjacent to each other in the character alignment direction. In this way, a new section element is formed correspondingly by the combination. The remaining section elements are adopted directly as new section elements without modification. As shown in FIG. 3D, the respective new section elements are obtained in the second altering step.

The sizes of respective characters of a character string region may be different from each other. In this case, there is a high possibility that a plurality of elements including relatively small characters are adjacent to each other in the character alignment direction thereof. However, it happens rarely that elements including punctuation marks are adjacent to each other in the character alignment direction thereof. In addition, it also happens rarely that elements including noise parts are adjacent to each other in the character alignment direction thereof.

Making use of this feature, in the second altering step, the section elements are combined, the dimensions of which in the character alignment direction are less than the aforementioned first reference dimension and which are adjacent to each other in the character alignment direction. In this way, a new section element is formed correspondingly by the combination. To be specific, when both width-wise dimensions of two adjacent section elements are less than the aforementioned first reference dimension, the two section elements are regarded as candidates to be combined. And then, with respect to two section elements which are the candidates to be combined, a sum total value is calculated by accumulating a width-wise dimension of the respective section elements and a distance between thereof. When the sum total value is less than a value calculated by multiplying the aforementioned first reference dimension by a predetermined ratio, the two adjacent section elements are combined. By doing so, a large element can be obtained by combining the elements including relatively small characters. For example, as shown in FIG. 3C, elements 441 and 442 including relatively small characters are combined, thus enabling a large element 443 to be obtained as shown in FIG. 3D. Consequently, this makes it possible to prevent elements including relatively small characters from being excluded undesirably in the second selecting step which will be described later on.

Additionally, in the second altering step, the remaining section elements are adopted as new section elements. In this way, the elements including punctuation marks and the elements including noise parts can be prevented from being combined undesirably with each other so as not to form a large element. As a result, this can ensure the exclusion of the elements including punctuation marks and elements including noise parts in the second selecting step which will be described later on.

The aforementioned first reference dimension is set based on the sizes of the section elements selected by the first selecting portion 403. Consequently, the aforementioned first reference dimension can be set appropriately. When the aforementioned first reference dimension is too small, there appears a problem of failing to combine elements including relatively small characters. Contrarily, when the aforementioned first reference dimension is too large, there appears a problem of combining even elements including relatively large characters. By setting the aforementioned first reference dimension appropriately, both of the problems can be prevented from occurring.

The aforementioned first reference dimension is set based on width-wise dimensions of the respective section elements or height-wise dimensions of the respective section elements. By doing so, the aforementioned first reference dimension can be set appropriately, despite of variation in the sizes of the respective section elements.

To be specific, the aforementioned first reference dimension is set at a value, which is calculated by multiplying an average value of width-wise dimension of the respective section elements by a predetermined ratio. The predetermined ratio is greater than 0 and less than 1. The aforementioned first reference dimension may also be set at a value, which is calculated by multiplying an average value of height-wise dimension of the respective section elements by a predetermined ratio. The predetermined ratio is greater than 0 and less than 1. The aforementioned first reference dimension may also be set according to other methods.

Figure 4A:
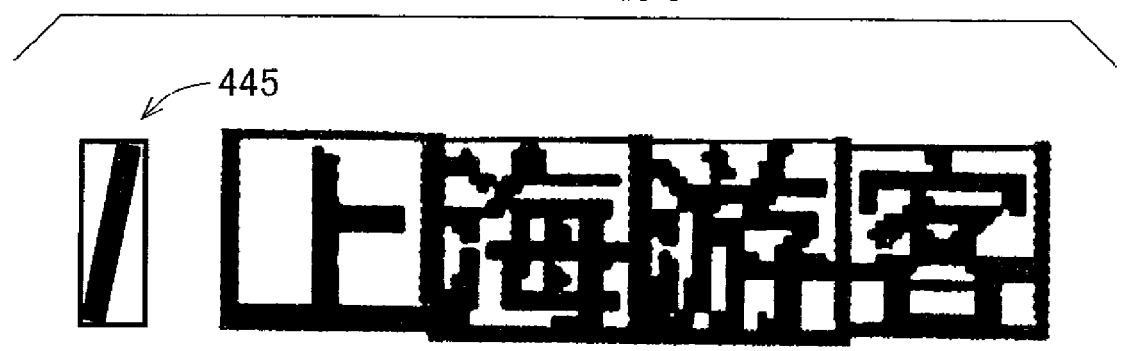
FIGS. 4A and 4B are views of assistance in explaining the second selecting step.
Figure 4B:
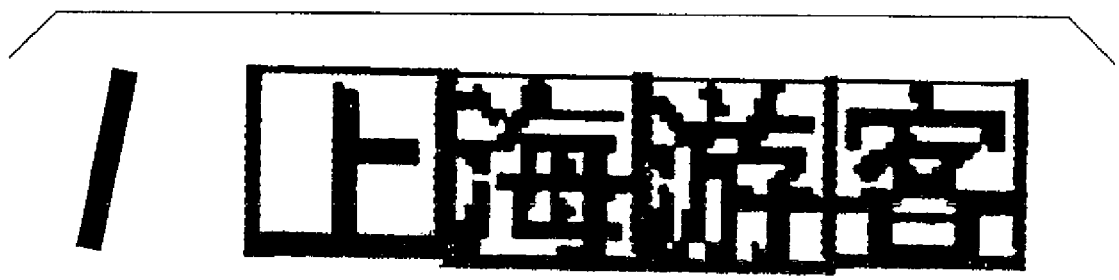
Figure 5A:
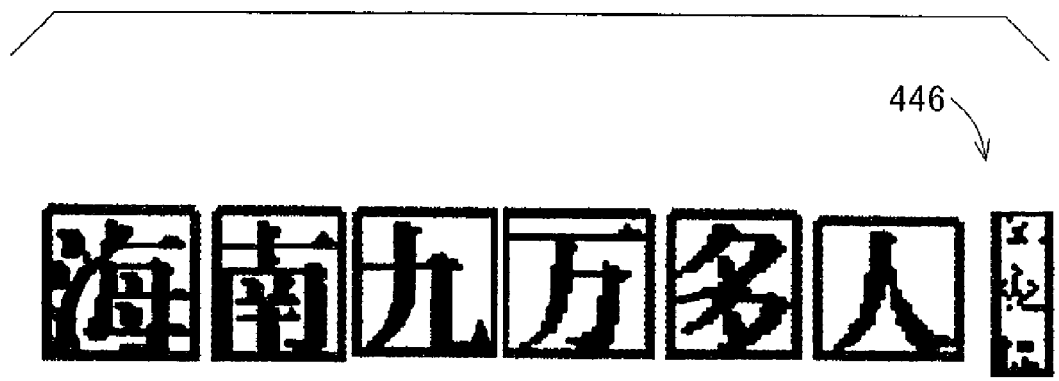
FIGS. 5A and 5B are views of assistance in explaining the second selecting step.
Figure 5B:

FIGS. 4A and 4B are views of assistance in explaining the second selecting step. FIG. 4A shows the respective section elements altered by the second altering step, and FIG. 4B shows the respective section elements selected by the second selecting step. FIGS. 5A and 5B are views of assistance in explaining the second selecting step. FIG. 5A shows the respective section elements altered in the second altering step, and FIG. 5B shows the respective section elements selected by the second selecting step.

In the second selecting step, the second selecting portion 405 determines the second reference dimension in advance. Further, of the section elements altered by the second altering portion 404, the second selecting portion 405 selects the section elements having a dimension greater than the aforementioned second reference dimension. In the second selecting step, the respective section elements are selected as shown in FIG. 4B and FIG. 5B.

In the second selecting step as have described above, of the section elements altered by the second altering portion 404, the section elements are selected, dimensions of which in the character alignment direction are greater than the aforementioned second reference dimension. Consequently, this can ensure the exclusion of the elements including punctuation marks and the elements including noise parts, from the section elements altered by the second altering portion 404.

The aforementioned second reference dimension is a dimension when viewed in a direction orthogonal to the character alignment direction of the character string region. The aforementioned second reference dimension is set based on the sizes of the section elements altered by the second altering portion 404. Accordingly, the aforementioned second reference dimension can be set appropriately. When the aforementioned second reference dimension is too small, there appears a problem of failing to excluding the elements including punctuation marks and the elements including noise parts. Contrarily, when the aforementioned second reference dimension is too large, there appears a problem of excluding even the elements including characters. By setting the aforementioned second reference dimension appropriately, both of the problems can be prevented from occurring.

In the second selecting step, all the section elements are selected except for the section elements, of which dimensions viewed in the character alignment direction are less than the aforementioned second reference dimension. In other words, even when a dimension of a section element in a direction orthogonal to the character alignment direction is greater than the aforementioned second reference dimension, the section element is excluded if a dimension viewed in the character alignment direction is less than the aforementioned second reference dimension. As has been mentioned above, selecting conditions are set strictly in the second selecting step. Consequently, this can ensure the exclusion of the elements including punctuation marks and the elements including noise parts.

For example, as shown in FIGS. 4A and 4B, an element 445 includes a thin line which is a noise part. And the element 445 is excluded in the second selecting step. In addition, as shown in FIGS. 5A and 5B, an element 446 includes characters that are exceedingly small compared with the remaining characters. And the element 446 is also excluded in the second selecting step.

The aforementioned second reference dimension is a dimension viewed in a direction orthogonal to the character alignment direction of the character string alignment direction. In the present embodiment, the aforementioned second reference dimension is set on the basis of the height-wise dimension of the character string dimension. By doing so, the aforementioned second dimension can be set appropriately, despite of variation in the sizes of the respective section elements.

To be specific, the aforementioned second reference dimension is set at a value calculated by multiplying a height-wise dimension of the character string region by a predetermined ratio. The predetermined ratio is greater than 0 and less than 1. The predetermined ratio of the second selecting step is greater than the predetermined ratio of the first selecting step. The aforementioned second reference dimension is selected to be, for example, 70% of the height-wise dimension of the character string region.

The aforementioned second dimension may also be set according to other methods. For example, the aforementioned second dimension may be set at a value calculated by multiplying an average value of width-wise dimension of the respective section elements by a predetermined ratio. In addition, the aforementioned second dimension also may be set at a value calculated by multiplying an average value of height-wise dimension of the respective section elements by a predetermined ratio.

The elements including characters can be extracted as character images from the character string region with a higher degree of accuracy, by performing the aforementioned second altering step and the aforementioned second selecting step. In other words, the extraction of elements including characters can be ensured without extracting faultily the elements including punctuation marks and the elements including noise parts.

Figure 6A:
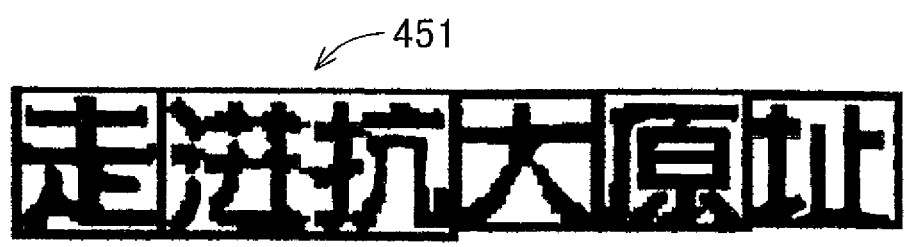
FIGS. 6A and 6B are views of assistance in explaining a dividing step.
Figure 6B:
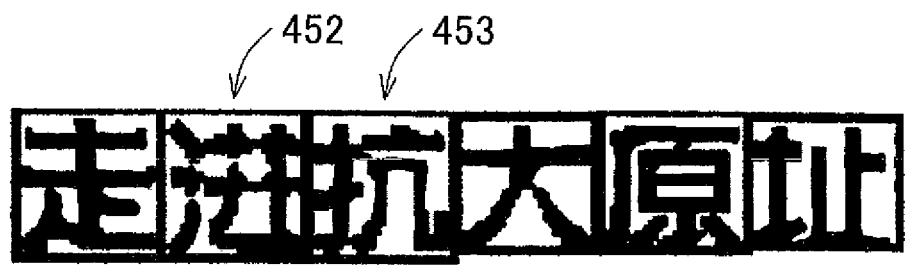

FIGS. 6A and 6B are views of assistance in explaining the dividing step. FIG. 6A shows the respective section elements selected by the second selecting step, and FIG. 6B shows the respective section elements divided by the dividing step.

In the dividing step, the dividing portion 406 determines the third reference dimension in advance. Of the section elements selected by the second selecting portion 405, the dividing portion 406 divides the section elements having a width-wise dimension greater than the aforementioned third reference dimension, on the basis of the aforementioned third reference dimension.

When section elements are extracted by the extracting step, one section element may include undesirably a plurality of characters adjacent to each other in the character aligning direction. In addition, when the section elements are altered in the first altering step and also when the section elements are altered in the second altering step, one section element may include undesirably a plurality of characters adjacent to each other in the character alignment direction.

Consequently, in the dividing step, of the section elements selected by the second selecting portion 405, the section elements are divided, of which dimensions viewed in the character alignment direction are greater than the aforementioned third reference dimension. The dividing is performed on the basis of the aforementioned third reference dimension. To be specific, a ratio is calculated between a width-wise dimension of the section elements and the aforementioned third reference dimension. And then, the section elements are equally-divided by a dividing value determined on the basis of the ratio. For example, as shown in FIG. 6, an element 451 which includes two characters are divided into two elements 452 and 453. Either of the two elements 452 and 453 includes one character. This makes it possible to prevent one section element from including a plurality of characters. In other words, from the character string region, a character image can be extracted for each of characters.

The aforementioned third reference dimension is set on the basis of the sizes of the section elements selected by the second selecting portion 405. Accordingly, the aforementioned third reference dimension can be set appropriately. When the aforementioned first reference dimension is too small, there appears a problem of dividing undesirably the elements that should not be divided. Contrarily, when the aforementioned third reference dimension is too large, there appears a problem of failing to divide the elements that should be divided. By setting the aforementioned third reference dimension appropriately, both of the problems can be prevented from occurring.

The aforementioned third reference dimension is set on the basis of an average value of width-wise dimension of the respective section elements or an average value of height-wise dimension of the respective section elements. In this way, the aforementioned third reference dimension can be set appropriately, despite of variation in the sizes of the respective section elements.

To be specific, the aforementioned third reference dimension is set at a value calculated by multiplying an average value of width-wise dimension of the respective section elements by a predetermined ratio. The predetermined ratio is greater than 0 and less than 1. In addition, the aforementioned third reference dimension may also be set at a value calculated by multiplying a maximum value of height-wise dimension of the respective section elements by a predetermined ratio. The predetermined ratio is greater than 0 and less than 1. The aforementioned third reference dimension may also be set according to other methods.

In the aforementioned embodiment, in the first selecting step, whether or not a section element is selected is determined on the basis of a size of the section element. However, in another embodiment of the present invention, whether or not a section element is selected may be determined in the aforementioned first selecting step, on the basis of a position of the section element. For example, the section elements may be excluded, that are located separately from the other portioning elements.

In addition, the second altering step and the second selecting step may be omitted in yet another embodiment of the invention.

Figure 7:
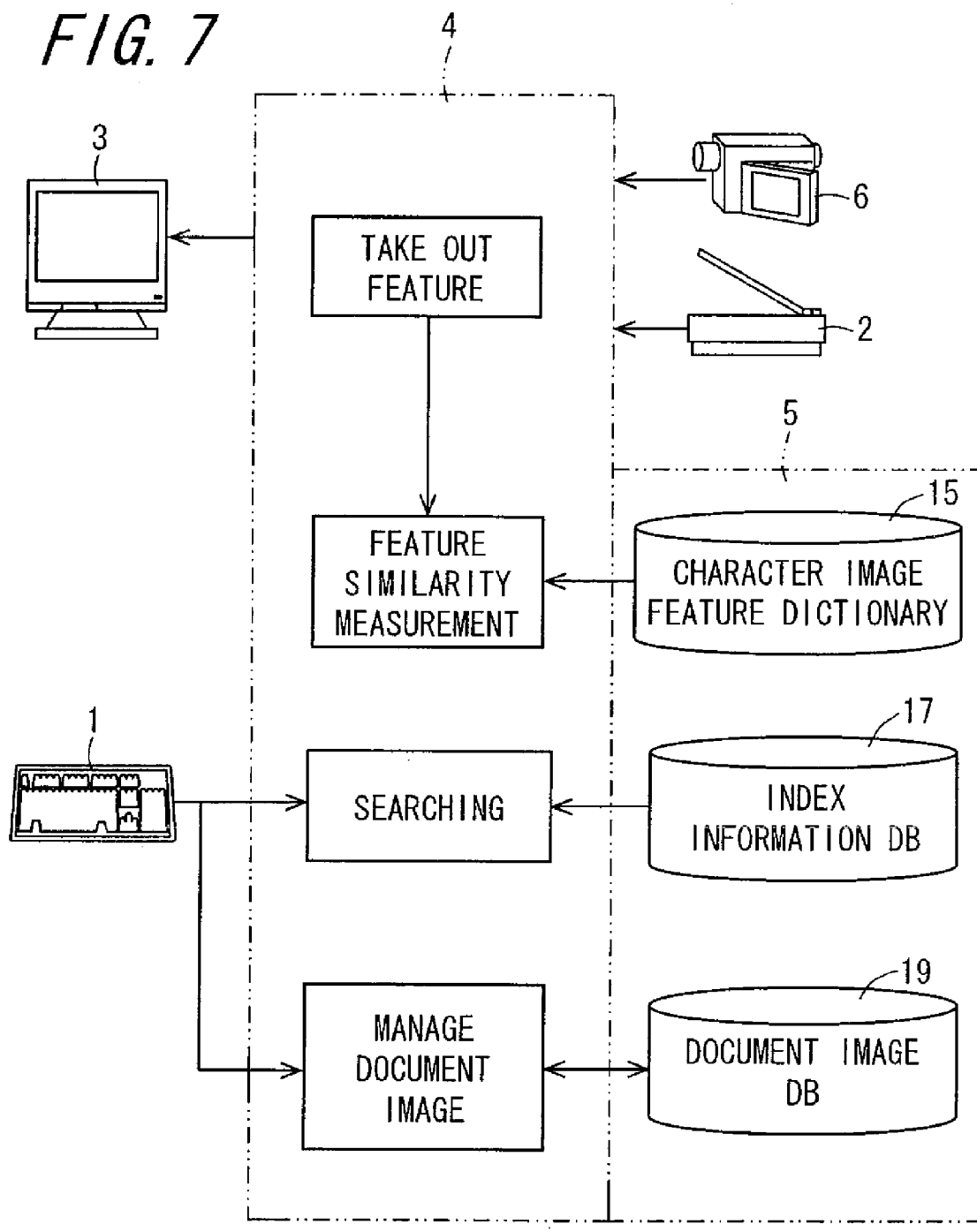
FIG. 7 is a block diagram schematically showing a constitution of a document image processing apparatus.

FIG. 7 is a block diagram schematically showing a constitution of the document image processing apparatus 10. The document image processing apparatus 10 includes a processor 4 and an external storage device 5. The external storage device 5 stores software etc. which is used by the processor 4 to perform an actual processing.

The processor 4 performs actually a document image feature extracting process, an index information producing process, a search process, a document image managing process, and the like. In the document image feature extracting process, a search key heading region is clipped from a document image. In the index information producing process, index information is produced that makes it possible to search the document image. The index information is used in the search process. In the document image managing process, a meaningful document name is prepared by use of the index information so as to manage the document image. The meaningful document name will be described later on.

The actual processing of the processor 4 is performed by use of the software stored in the external storage device 5. The processor 4 is constructed of, for example, a main body of a common computer. In the present embodiment, the processor 4 is so provided as also to be able to perform a character image feature dictionary preparing process. In the character image feature dictionary preparing process, a character image feature dictionary 15 is prepared which is used in the index information producing process and will be described later on.

The external storage device 5 can be constructed of, for example, a fast accessible hard disk. For the sake of holding a large quantity of document images, it is acceptable that the external storage device 5 is constructed of a high-capacity device such as an optical disc. The external storage device 5 is designed for use in preparing the character image feature dictionary 15, an index information database (index information DB) 17, a document image database (document image DB) 19, a character shape specimen database (character shape specimen DB) 13, and the like component, which will be described later on.

A keyboard 1 and a display device 3 are connected simultaneously to the document image processing apparatus 10. The keyboard 1 is used for inputting a search keyword. In addition, the keyboard 1 is also used for inputting an instruction at the time of browsing a document image. Further, the keyboard 1 is also used for modifying set values, such as the number of candidate characters, a correlation value, and a degree-of-correlation weighting factor for rows Q, which will be described later on. The display apparatus 3 outputs and thereby displays the document image, etc. The content displayed by the display device 3 includes degree-of-correlation information, an image name, and the like information.

An image scanner 2 or a digital camera 6 is further connected to the document image processing apparatus 10. The image scanner 2 and the digital camera 6 are used for acquiring the document image. A way to acquire the document image is, however, not limited to the way where the image scanner 2 or the digital camera 6 is used. The acquirement of the document image may be realized by communication across a network, and the like. In addition, the image scanner 2 or the digital camera 6 may be used to input the search keyword.

Figure 8B:
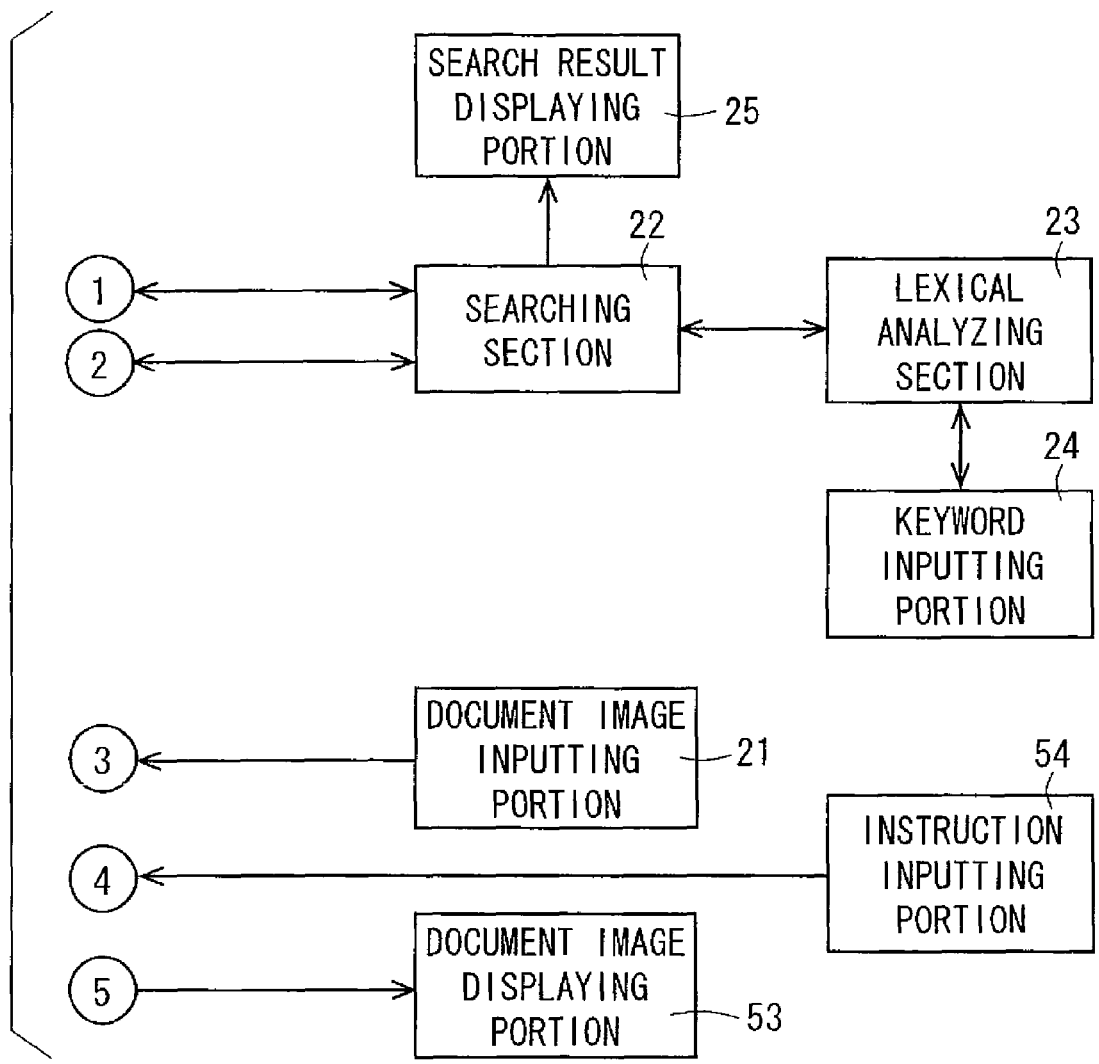

FIGS. 8A and 8B are block diagrams showing in detail the constitution of the document image processing apparatus 10. The document image processing apparatus 10 includes a character database inputting portion (character DB inputting portion) 11, a character style normalization processing portion 12, the character shape specimen DB 13, a character image feature extracting portion (image feature extracting portion) 14, the character image feature dictionary 15, a feature similarity measurement portion 16, the index information DB 17, a heading region initial processing portion 18, the document image DB 19, a document image feature database (document image feature DB) 20, a document image inputting portion 21, a searching section 22, a lexical analyzing section 23, a keyword inputting portion 24, a search result displaying portion 25, a document name preparing portion 51, a document image DB managing portion 52, a document image displaying portion 53, and an instruction inputting portion 54.

Among the components listed above, the character DB inputting portion 11, the character style normalization processing portion 12, the character shape specimen DB 13, the character image feature extracting portion 14, and the character image feature dictionary 15 constitute a character image feature dictionary producing section 30 which performs the aforementioned character image feature dictionary preparing process.

Firstly, descriptions are given to the aforementioned functional blocks 11, 12, 13, 14, and 15 which constitute the character image feature dictionary producing section 30.

The character DB inputting portion 11 is used for inputting a fundamental character database which is necessary for preparing the character image feature dictionary 15. When the present apparatus is adaptable to, for example, Chinese, 6763 characters in the GB2312 of People's Republic of China, and the like element are all inputted to the character DB inputting portion 11. In addition, when the present apparatus is adaptable to Japanese, approximately 3000 characters of JIS level-1, and the like element are inputted to the character DB inputting portion 11. That is to say, the characters mentioned herein include symbols. The character DB inputting portion 11 as has been described heretofore is constructed by the processor 4. The character database is provided via a recording medium or across a network, or the like.

The character style normalization portion 12 is designed to prepare character images different in font and size, of all the characters included in the character database inputted by the character DB inputting portion 11. The character images different in font and size are stored in the character shape specimen DB 13.

FIG. 9 shows a process on how the character style normalization processing portion 12 prepares the character shape specimen DB 13. When the present apparatus is adaptable to Chinese, the character style normalization processing portion 12 is provided with, for example, a character shape specimen 12a such as Song style, Fangsong style, Hei style, and Kai style. In addition, when the present apparatus is adaptable to Japanese, the character style normalization processing portion 12 is provided with, for example, a character shape specimen such as MS Ming-cho style and MS Gothic style.

The character style normalization processing portion 12 includes a character shape specimen 12a, a transformation processing part 12b, and a character style standardizing part 12c. The transformation processing part 12b images the characters in the character database and standardizes resulting character images. Next, in reference to the character shape specimen 12a, the transformation processing part 12b performs a transformation process on the standardized character images and further prepares character images different in font and size. The transformation process includes a feathering process, a scaling process, and a refining process. The character images already treated with the transformation process as mentioned above are brought by the character style standardizing part 12c to the character shape specimen DB 13 where the character images are then stored as reference character images.

In the character shape specimen DB 13, the reference character images of all the characters in the character database are stored in units of the character shape which is defined by font and size even for one identical character. To cite a case, even for one character "中" in the character type, the character shape specimen DB 13 stores as many the reference character images "中" different in shape as the predetermined number of the font. In addition, the character shape specimen DB 13 also stores as many the reference character images "中" different in size as the predetermined number of the size.

The character image feature extracting portion 14 extracts features of character image (abbreviated as the "image features") and stores the extracted features in the character image feature dictionary 15 where the extracted features are then stored. In the present embodiment, the character image feature extracting portion 14 extracts the features of character image by combining character image peripheral features and grid-direction-wise features. The extracted features of character image are adopted as feature vectors. Note that the features of character image are not limited to the features just described, and other features may be extracted to be feature vectors.

Figure 10:
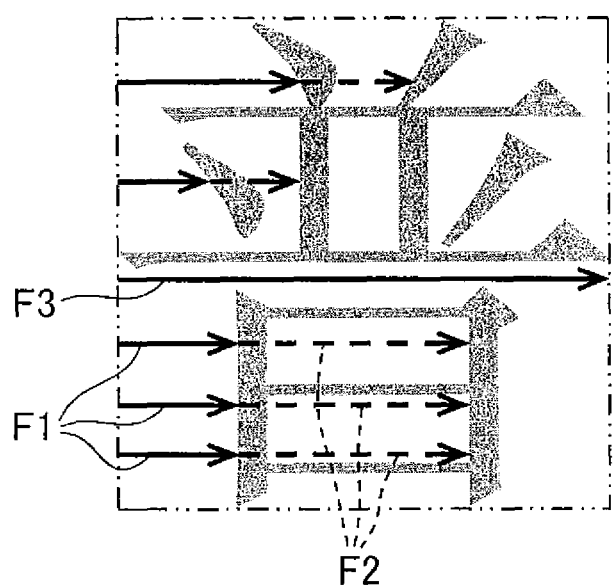
FIG. 10 is an illustration of character image peripheral features.

Here, descriptions will be given to the character image peripheral features and the grid-direction-wise feature. FIG. 10 is an illustration of the character image peripheral features. The character image peripheral features refer to outline features viewed from without. As shown in FIG. 10, scanning from four sides of a circumscribing rectangle of the character image, a distance from the four sides thereof to a border point between a white pixel to a black pixel is defined as a feature. A position of the first change of the pixel color and a position of the second change of the pixel color are taken out.

For example, the circumscribing rectangle is divided into X rows and Y columns. In this case, the image is subjected to leftward scanning and rightward scanning respectively row by row and is subjected to upward scanning and downward scanning respectively column by column. Note that FIG. 10 shows a diagram where the image is subjected to leftward scanning row by row.

In FIG. 10, a solid arrow F1 indicates a scanning path to the point of the first change of pixel color from white to black. A dashed arrow F2 indicates a scanning path extending to the point of the second change of pixel color from white to black. A solid arrow F3 indicates a scanning path through which no points of pixel color change from white to black are detected. In this case, the distance value is zero.

Figure 11A:
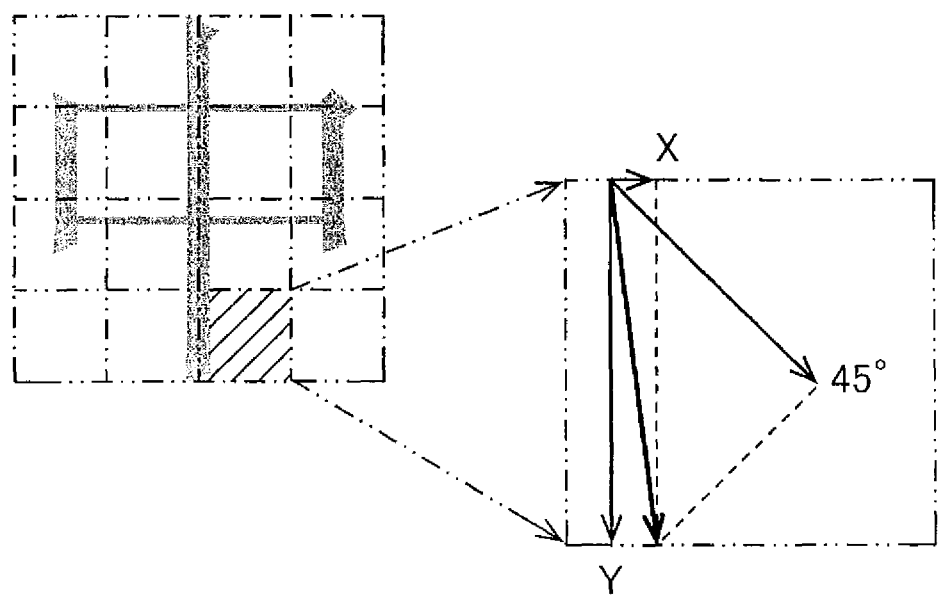
FIGS. 11A and 11R are illustrations of grid-direction-wise features.
Figure 11B:
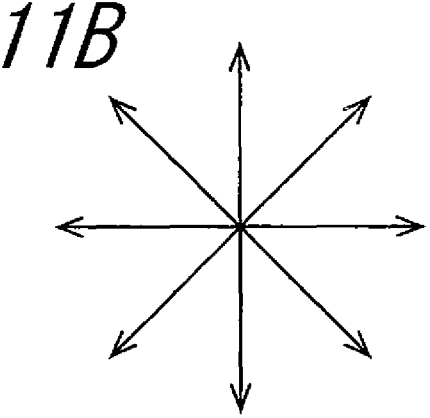

FIGS. 11A and 11B are illustrations of the grids direction-wise features. A character image is divided in a rough grid pattern. An attempt is made in a plurality of predetermined directions to detect black pixels in the respective grids. A number of black pixels which are connected in each of the directions is counted, and direction contributing degrees which represent a distribution state of the black pixels with respect to each of the direction components thereof is calculated by dividing distance values by a value corresponding to a difference in number of black pixels using Euclidean distance as a discrimination function.

In FIG. 11A, the character image is divided into 16 grids in a 4×4 grid pattern, and black pixels are attempted to be detected in three directions of X-axis direction (0°), a 45-degree direction, and a Y-axis direction (90°) from a center point, i.e., a point of change of pixel color form black to white, which point is located at the shortest distance in the X-axis direction from a grid intersection.

In the present embodiment, the character image is divided in an 8×8 square mesh pattern. As shown in FIG. 11B, black pixels are attempted to be detected in eight directions, namely, a 0-degree direction, a 45-degree direction, a 90-degree direction, a 135-degree direction, a 180-degree direction, a 225-degree direction, a 270-degree direction, and a 315-degree direction.

Note that grid-direction-wise feature extracting methods may be various with different directions in which black pixels are attempted to be detected or with different positions of the center point about which black pixels are attempted to be detected. For example, refer to the descriptions in Japanese Unexamined Patent Publication JP-A 2000-181994.

The character image feature extracting portion 14 carries out the extraction of feature of character image as just described, on all the reference character images stored in the character shape specimen DB 13. And the character image feature extracting portion 14 stores an extraction result of the reference character image stored in the character shape specimen DB 13 in the character image feature dictionary 15 where the extraction result is then stored, thus producing the character image feature dictionary 15.

Figure 12:
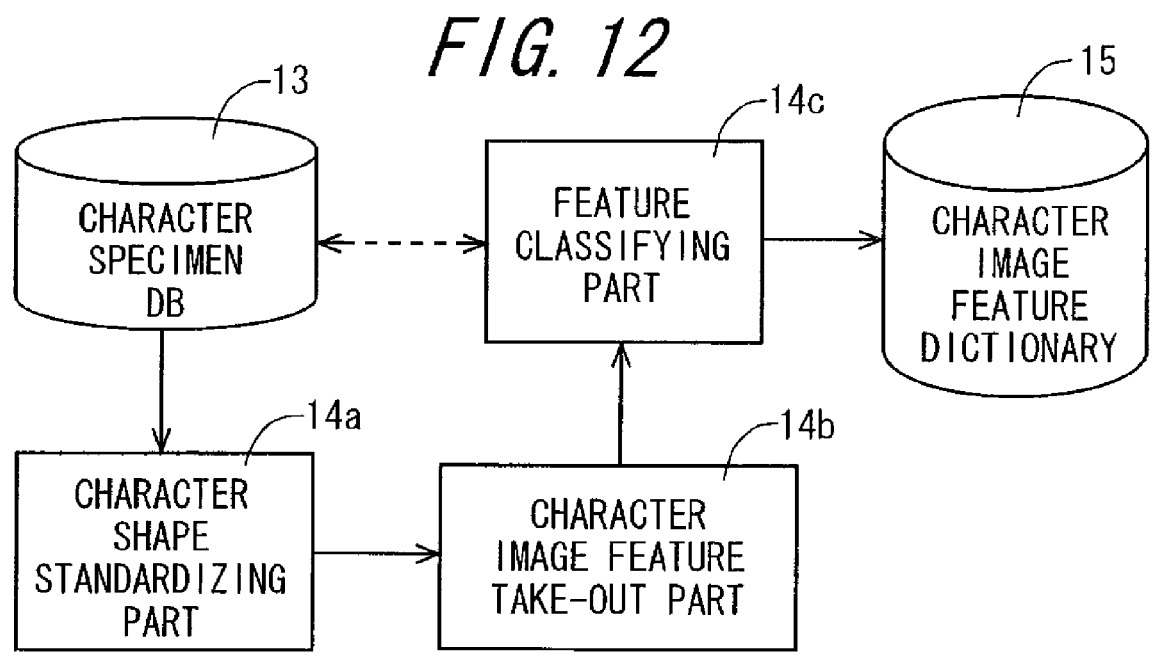
FIG. 12 is an illustration showing a process on how to prepare a character image feature dictionary.

FIG. 12 shows a process on how the character image feature extracting portion 14 prepares the character image feature dictionary 15. In the character image feature extracting portion 14, a character shape standardizing part 14a takes out a reference character image from the character shape specimen DB 13, and a character image feature take-out part 14b takes out features of the reference character image taken out by the character shape standardizing part 14a. And then, in reference to the character shape specimen DB 13, a feature classifying part 14c classifies the features extracted in units of reference character image, and stores the classified features in the character image feature dictionary 15 where the classified features are then stored.

As has been described heretofore, the character image feature take-out part 14b determines a feature adaptive value of the differently-weighted reference character images in units of single character and acquires a standard feature of the reference character images.

The character image feature take-out part 14b can prepare various character image feature dictionaries by weighting different character styles and character sizes. The image features of multi-font characters are combined with each other to form features of single character image which are used to prepare a character image feature dictionary. This enables to satisfy automatic index and management of a document image composed of multi-font and/or multi-size characters.

Next, descriptions will be given to the document image DB 19, the document image feature DB 20, the heading region initial processing portion 18, and the character image feature extracting portion 14, which constitute a document image feature extracting section 31 for performing the document image feature extracting process.

The document image DB 19 is used to append a document ID for identification to a document image inputted by the document image inputting portion 21 and store the document image with the document ID.

After a new document image is stored in the document image DB 19, the heading region initial processing portion 18 is used to locate a heading region of the document image according to the image data thereof, clip the heading region, and send character images thereof to the aforementioned character image feature extracting portion 14.

Figure 15:
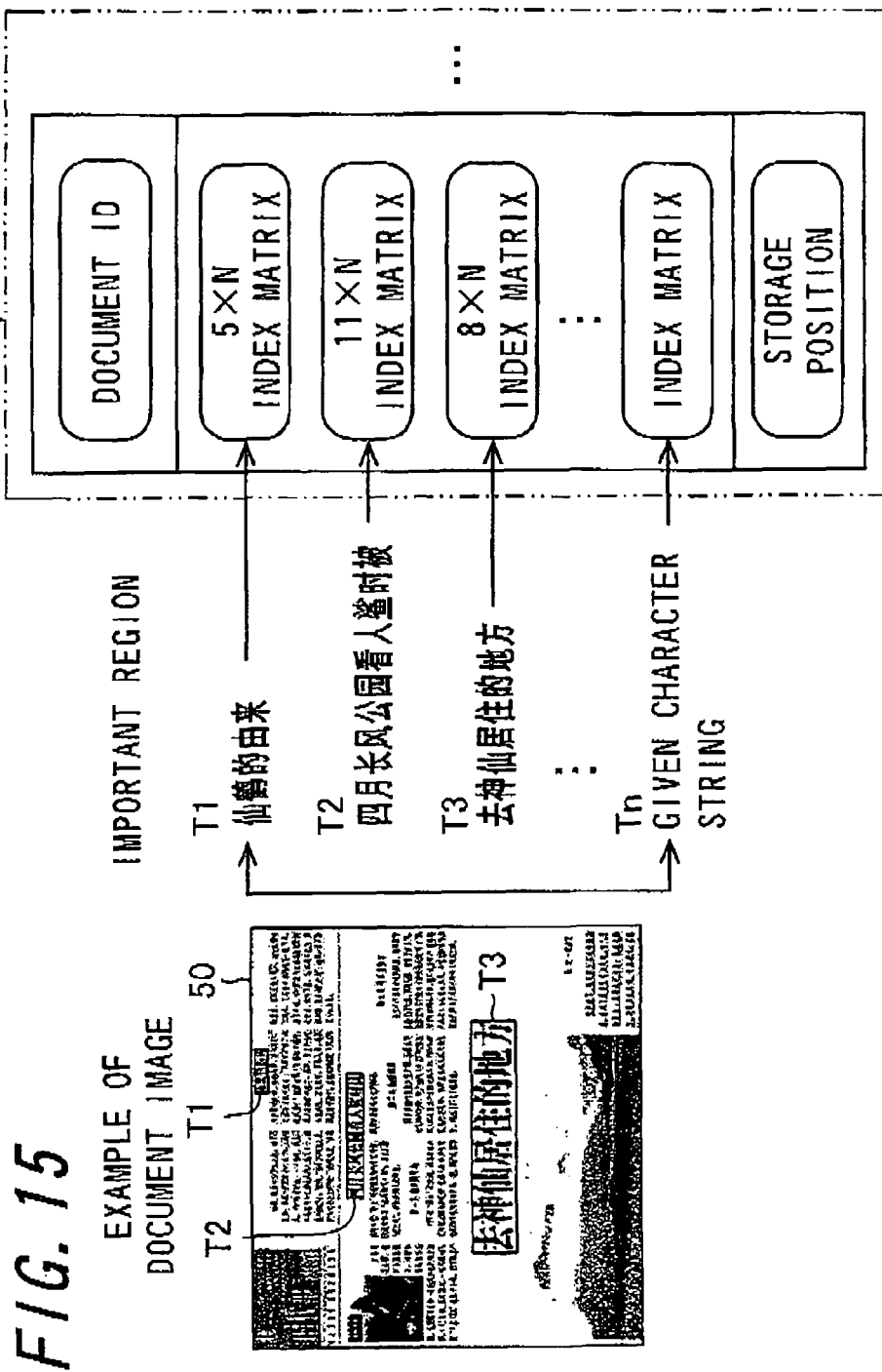
FIG. 15 is an illustration showing an example of a document image and a data placement example of index information of the document image in the index information database.

FIG. 15 shows a state where three heading regions T1, T2, and T3 have been located in a document image 50. As will be appreciated from FIG. 15, title parts of the document image 50 are clipped as heading regions T.

The character images which are clipped by the heading region initial processing portion 18 and thereafter sent to the character image feature extracting portion 14, are generally images of character string including a plurality of characters. Accordingly, the following descriptions will be based on that the character images sent by the heading region initial processing portion 18 are the images of character string.

In the present embodiment, the heading region initial processing portion 18 locates the heading regions and clips the heading regions by means of a projection method and a statistical analysis of communicating area. Note that the heading regions T as mentioned above often correspond to tile parts. Various existing methods can be applied to locate and clip the heading regions, for example, the methods described in the Japanese Unexamined Patent Publications JP-A 9-319747 (1997) and JP-A 8-153110 (1996).

As has been described above, only the heading regions T are located and clipped, without covering the whole character region (text region) of a document image. This enables a reduction in an amount of information to be searched, thereby shortening searching time.

Locating only the heading regions T, not the whole text region, is however not an essential constituent factor from the aspect of searching, and the whole text region may be located and clipped. Locating only the heading regions T is, on the other hand, an essential constituent factor from the aspect of preparing meaningful document names which will be described later on.

The character image feature extracting portion 14 clips each of character images by the aforementioned character image extracting methods, from the images of character string inputted from the heading region initial processing portion 18. After that, the character image feature extracting portion 14 extracts features of each of character images, as in the case of preparing the character image feature dictionary 15. Subsequently, the extracted features are stored, for every document image, in the document image feature DB 20.

The document image feature DB 20 stores image feature information of character string included in the heading regions T which have been clipped by the heading region initial processing portion 18, as a feature (feature vector) of each of characters constituting the character string.

As shown in FIG. 15, with respect to one document image 50, the document image feature DB 20 stores, together with the document ID of the document image 50, the character image features of character strings included in all the clipped heading regions T1, T2, T3 . . . , or the character image features of the respective characters constituting the character strings.

Next, descriptions will be given to the character image feature extracting portion 14, the character image feature dictionary 15, the feature similarity measurement portion 16, the index information DB 17, and the document image feature DB 20 which constitute an index information producing section 32 for performing an index information preparing process.

The functions of the character image feature extracting portion 14, character image feature dictionary 15, and document image feature DB 20 are as already described above.

The feature similarity measurement portion 16 reads out features, from the document image feature DB 20, of the character images included in the heading regions T of document image. On the basis of the read-out features, the feature similarity measurement portion 16 prepares, in reference to the character image feature dictionary 15, an index matrix as mentioned later, thereby producing index information of document image.

In this case, the index information is produced for each of document images, and the index matrix included in the index information is prepared for each of heading regions T. Accordingly, when one document image includes a plurality of heading regions T, a plurality of index matrices will be included in the index information of the document image.

Figure 13:
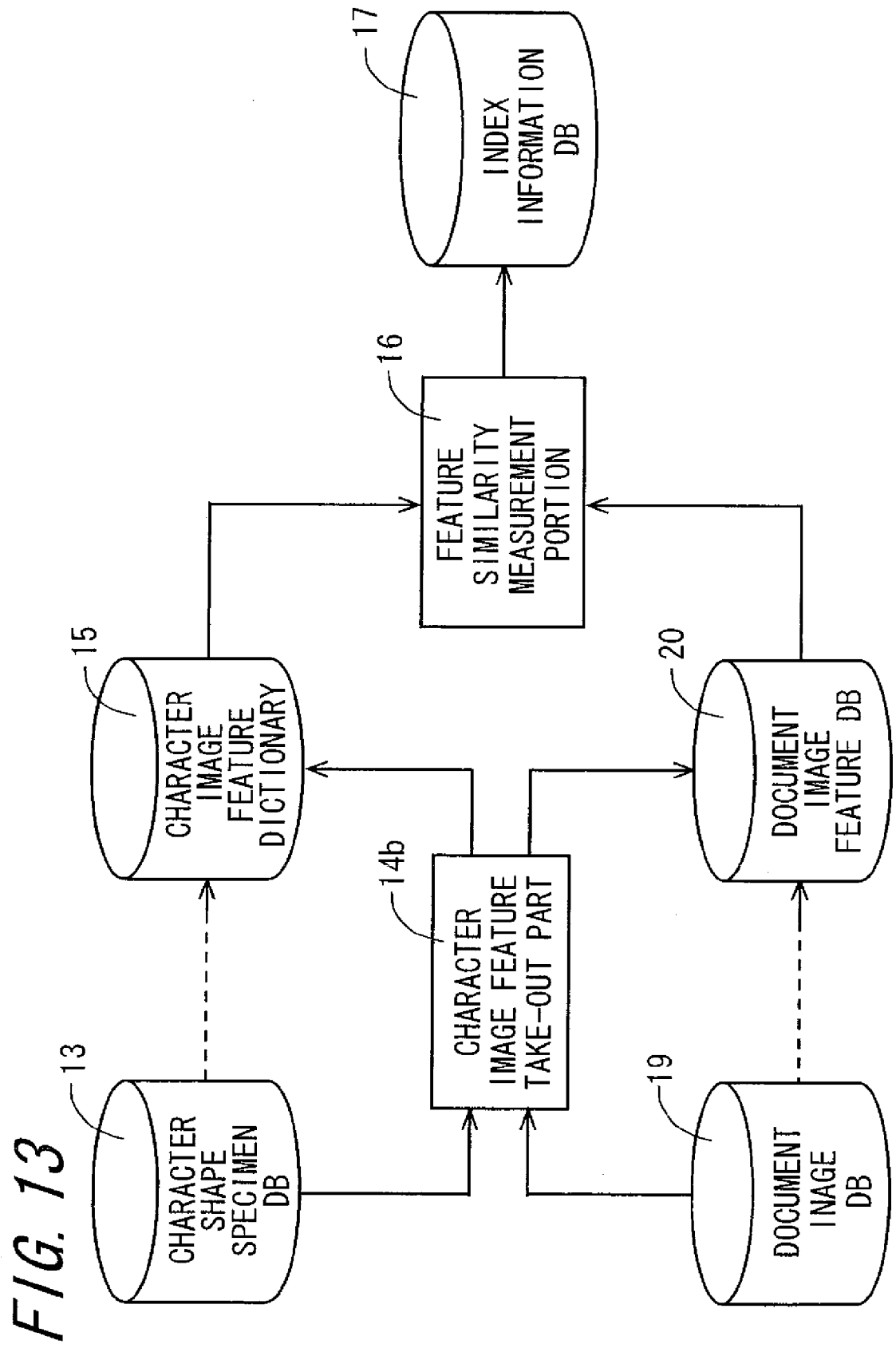
FIG. 13 is an illustration showing a process on how to prepare an index information database.

FIG. 13 shows a process on how to prepare the index information DB 17. As mentioned above, after a certain document image is inputted and stored in the document image DB 19, the character image feature extracting part 14b extracts character image features of a character string included in each of heading regions T and stores the extracted features in the document image feature DB 20 where the extracted feature is then stored.

The feature similarity measurement portion 16 reads out from the document image feature DB 20 the image features of the character string included in each of reading regions T. And then, the feature similarity measurement portion 16 carries out measuring similarity of the image of every single character with the reference character image included in the character image feature dictionary 15, thereby preparing an index matrix for each of heading regions T.

And then, the feature similarity measurement portion 16 forms index information by combining these index matrices with the other information of the document image, i.e., information such as the document ID and storage position of the document image in the document image DB 19. The feature similarity measurement portion 16 stores the index information in the index information DB 17 where the index information is then stored.

Figure 14:
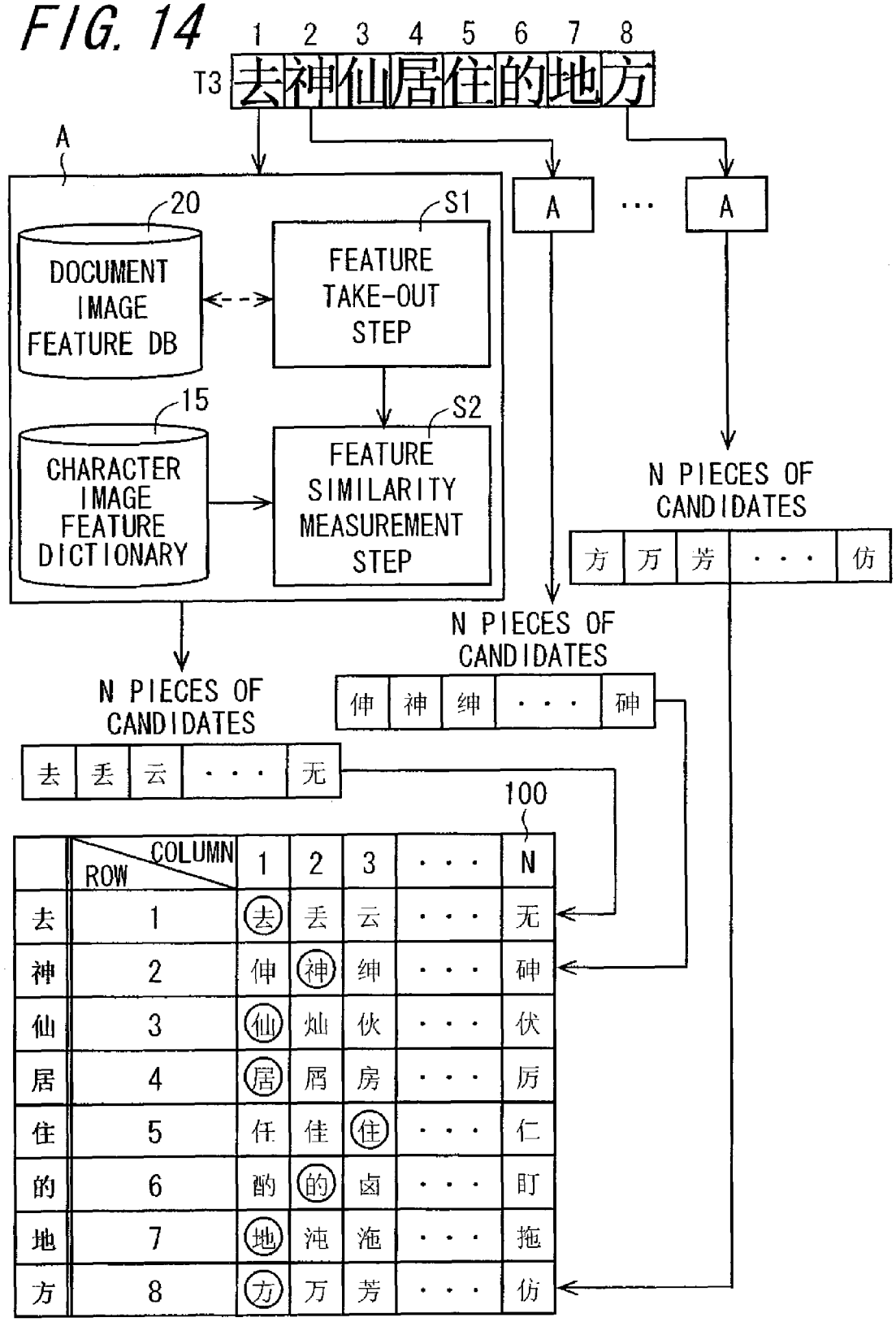
FIG. 14 is an illustration showing a specific example of a process on how to prepare an index matrix.

FIG. 14 shows one example of a process on how the feature similarity measurement portion 16 prepares the index matrix. FIG. 14 is an illustration on how to prepare an index matrix corresponding to eight character images of a character string "去神仙居住的 地方" included in the heading region T3 of FIG. 15.

The character string "去神仙居住的 地方" is divided into images of separate characters of "去", "神", "仙", "居", "住", "的", "地", and "方".

Eight numbers from 1 to 8 are assigned to the eight characters of "去", . . . , "方" according to an alignment order thereof, in such a manner that a number 1 is assigned to "去", . . . , and a number 8 is assigned to "方". The numbers here correspond to row numbers of the index matrix.

All of the above eight character images are subjected to a process comprising a feature take-out step (S1) and a feature similarity measurement step (S2) as indicated by a referential symbol A in FIG. 14. Step S1 is designed for taking out features of the character image "去" stored in the document image feature DB 20. Step S2 is designed for selecting N pieces of candidate characters in descending order of feature similarity (or in the descending order of degree of similarity) in reference to the character image feature dictionary 15.

Numbers corresponding to the extracting order are assigned to the N pieces of candidate characters extracted in descending order of degree of similarity. The numbers correspond to column numbers of the index matrix. A character correlation value (a correlation value) represents a degree of similarity between each of search characters included in a search keyword and candidate characters thereof. The correlation value is set according to the column numbers.

A table indicated by a reference numeral 100 in FIG. 14 shows the content of index matrix of the character string "去神仙居住的 地方". For example, for the character image of the fifth character "住", candidate characters of "任", "件", "住", . . . , "仁" are extracted and positioned in Row 5 in descending order of degree of similarity. The character having the highest degree of similarity is positioned in the first column. In Table 100, the position of the candidate character "去" is represented as [1, 1], the position of the candidate character "屑" is represented as [4, 2], and the position of the candidate character "仁" is represented as [5, N].

Note that the candidate characters corresponding to the respective characters in the character string are circled in Table 100 of FIG. 14, to facilitate the understanding.

The row number M of the index matrix as has been described heretofore, is determined in accordance with the number of image character in the character string that is clipped as the heading region T by the heading region initial processing portion 18. In addition, the column number N is determined in accordance with the number of candidate characters selected in units of character. Consequently, according to the present invention, by changing the number of dimensions (the number of columns) of index matrix, it is possible to flexibly set the number of elements inside the index matrix or the number of candidate characters. This allows for a precise and substantially complete search in searching the document image.

A way on how the selected candidate character carries information in the index matrix can be appropriately set in accordance with a method of inputting the search keyword. For example, in the constitution that the keyword is inputted from the keyboard 1, the candidate characters are stored in form of information such as character codes, in such a manner that the search keyword inputted from the keyboard 1 can be targeted for searching.

In addition, in the constitution that the keyword is inputted in form of digital data by use of the image scanner 2 and the like, the candidate characters may be stored in form of feature (feature vector) information, in such a manner that the features (feature vectors) of the search keyword can be extracted and the extracted feature vectors can be compared with each other for searching.

FIG. 15 shows a data placement example of index information in the index information DB 17. In index information of a document image 50 having a plurality of heading regions T1, T2, T3, . . . , Tn, index matrices are linearly-aligned that have been prepared with respect to the plurality of heading regions T1, T2, T3, . . . , Tn. In an example of FIG. 15, a document ID is placed on the top, followed by a plurality of the index matrices, and information of a storage position is placed on the bottom. Here, 5×N represents a size of the index matrix, which has five rows and N columns.

By placing the index information in the way as has been mentioned heretofore, it is possible to swiftly identify storage positions of document image and positions of heading region T of document image in the document image DB 19. The aforementioned identified position information can be used for displaying a search result.

Moreover, in response to a demand in practice, other attributes of the document image may be added to the index information.

Figure 16:
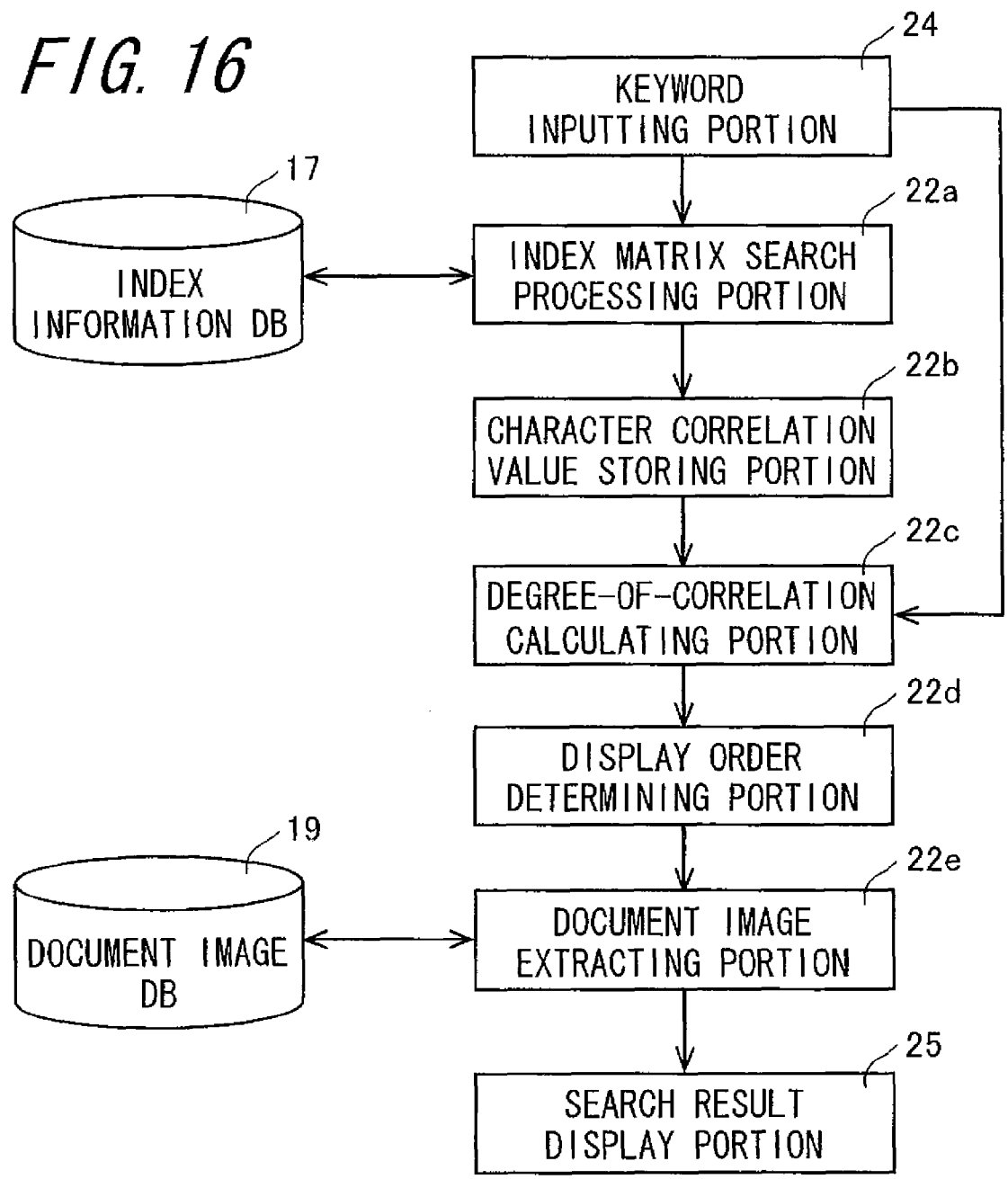
FIG. 16 is an illustration showing functions and a search process of a searching section.

Next, descriptions will be given to a searching section 22, which performs a search process by use of the index information. FIG. 16 is an illustration showing functions and a search process of the searching section 22. The searching section 22 includes an index matrix search processing portion 22a, a character correlation value storing portion (storing portion) 22b, a degree-of-correlation calculating portion 22c, a display order determining portion (order determining portion) 22d, and a document image extracting portion 22e.

A search keyword is inputted from the keyword inputting portion 24 to the index matrix search processing portion 22a. An example of the keyword inputting portion 24 is the aforementioned keyboard 1 or the aforementioned image scanner 2, etc.

The index matrix search processing portion 22a searches the index information DB 17 so as to detect index matrices including the inputted search keyword. The index matrix search processing portion 22a divides the search keyword into separate search characters and searches for the index matrices including the respective search characters. In this way, when the search characters are included, the index matrix search processing portion 22a acquires matching position information in the index matrices of the search characters. Note that an example of procedure for extracting the index matrix will be described in reference to a flowchart in FIG. 17.

The character correlation value storing portion 22b stores the matching position information acquired by the index matrix search processing portion 22a, and also stores a character correlation value corresponding to the column number of matching position.

After the index matrix search processing portion 22a completes the detection of all the index matrices, the degree-of-correlation calculating portion 22c calculates a degree of correlation between a detected index matrix and the search keyword.

By means of a predetermined method for calculating the degree of correlation, the degree of correlation is calculated using the information of matching position and the information character correlation value stored in the character correlation value storing portion 22b. The calculation of the degree of correlation will be described in reference to FIGS. 18 and 19 later on.

Note that although the constitution employed herein has the character correlation value storing portion 22b which stores the matching position information and the character correlation value corresponding to the column number of the matching position, another constitution may be adopted such that the character correlation value storing portion 22b stores only the matching position information while the degree-of-correlation calculating portion 22c acquires the character correlation value corresponding to the matching position information.

The display order determining portion 22d determines a display order on the basis of the information of degree of correlation calculated by the degree-of-correlation calculating portion 22c. According to an order of document images which are arranged in descending order of degree of correlation of the index matrixes included therein, the display order determining portion 22d determines the display order in such a manner as to allow the content of document images to be displayed by the search result displaying portion 25.

The document image extracting portion 22e reads out image data of document image from the document image DB 19 and outputs the image data to the search result displaying portion 25 so that the document image is displayed on the search result displaying portion 25 in the order determined by the display order determining portion 22d.

The search result displaying portion 25 displays document images according to a display order. The document images may be displayed in thumbnailed form or the like. An example of the search result displaying portion 25 is the aforementioned display device 3 or the like device.

Figure 17:
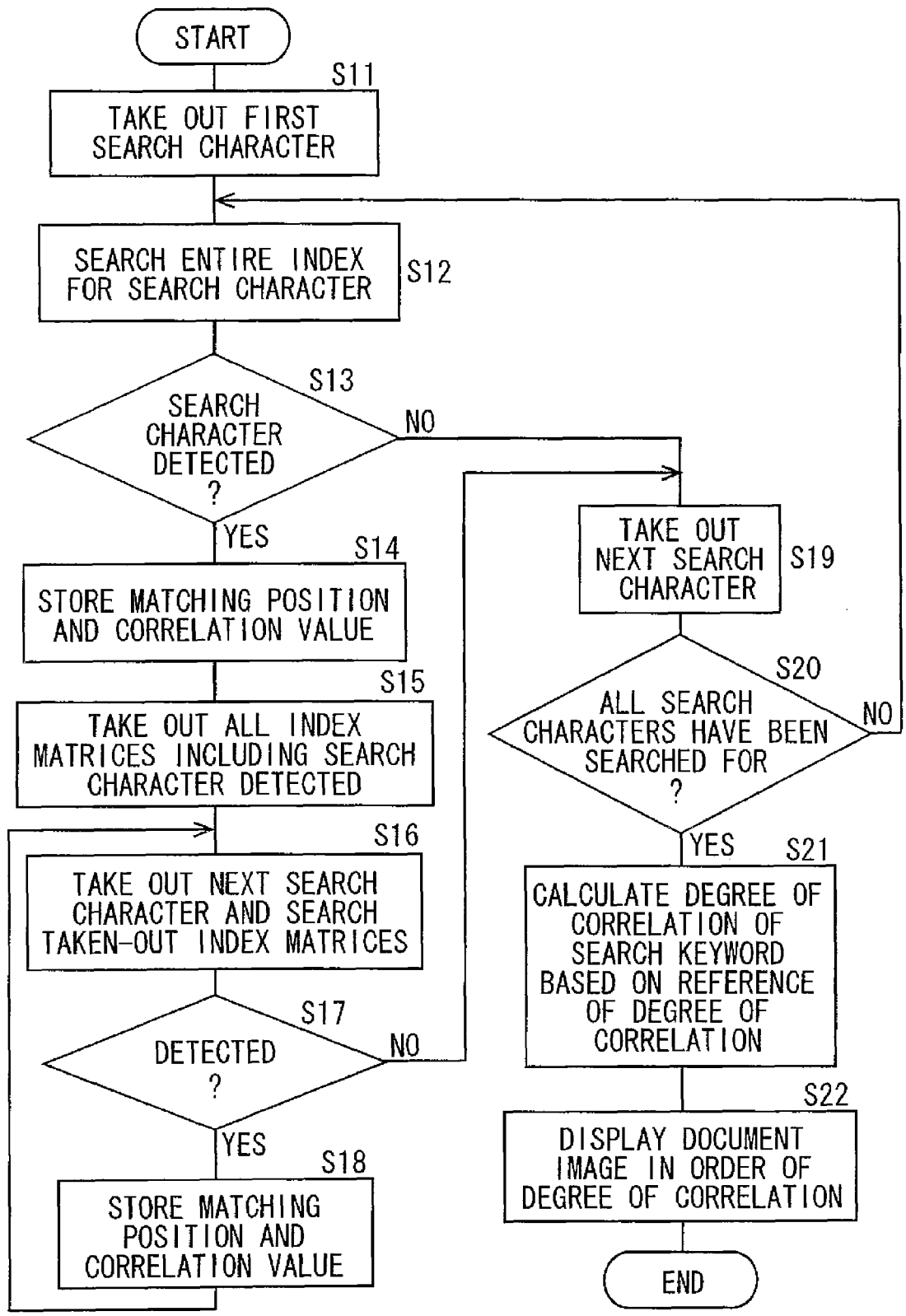
FIG. 17 is a flowchart showing a search procedure in the searching section.

Now, the search procedure will be described. FIG. 17 is a flowchart showing the search procedure in the searching section 22. Step S11 is firstly performed when a search keyword composed of R pieces of character string is inputted and a searching instruction is given correspondingly. In Step S11, the index matrix search processing portion 22a extracts the first search character of the search keyword.

Next, the search procedure goes to Step S12. In Step S12, the index matrix search processing portion 22a searches for the first search character in all the index matrices of the index information DB 17.

When all the index matrices have been searched, it is determined whether or not the first search character has been detected. When the first search character has not been detected at all, the search procedure goes to Step S19. Contrarily, when the first search character has been detected, the search procedure goes to Step S14.

In Step S14, the index matrix search processing portion 22a stores matching position information and character correlation values of the index matrices including the first search character, in the character correlation value storing portion 22b where the matching position information and character correlation values are then stored.

Subsequently, the search procedure goes to Step S15. In Step S15, the index matrix search processing portion 22a extracts all index matrices including the first search character. And then, in Step S16, the index matrix search processing portion 22a extracts another character of the search keyword, which serves as the second search character, and searches for the second search character in the index matrices including the first search character.

After all the index matrices extracted in Step S15 have been searched, the search procedure goes to Step S17. In Step S17, it is determined whether or not the second search character has been detected. When the second search character has not been detected at all, the search procedure goes to Step S19 as in the above case. Contrarily, when the second search character has been detected, the search procedure goes to Step S18.

In Step S18, the index matrix search processing portion 22a stores matching position information and character correlation values of the index matrices including the second search character, in the character correlation value storing portion 22b where the matching position information and character correlation values are then stored.

Next, back to Step S16 again, the index matrix search processing portion 22a extracts yet another character of the search keyword, which serves as the third search character. And further, the index matrix search processing portion 22a searches for the third search character in the index matrices including the first search character extracted in Step S15.

And then, similarly, when the aforementioned search has been completed, Step S17 is performed. In Step S17, the index matrix search processing portion 22a determines whether or not the third search character has been detected. When the third search character has not been detected at all, the search procedure goes to Step S19 as in the above case. Contrarily, when the third search character has been detected, the search procedure goes to Step S18. In this way, the aforementioned search process is performed with respect to yet another search character of the search keyword.

The process from Step S16 to Step S18 as has been described heretofore, refers to a search refinement for the second or following search character in the index matrices which include the first search character and thus extracted in Step S15. The index matrix search processing portion 22a performs the above process from Step S16 to Step S18 until such a determination is obtained in Step 17, that the search character has not been detected at all, or until such a determination is obtained that all the search characters in the search keyword have been searched for. The search procedure then goes to Step S19.

In Step 19, the index matrix search processing portion 22a takes out a next character in the search keyword, which serves as the second search character. Subsequently, in Step S20, it is determined whether or not the last search character has been searched for, that is, whether or not all the search characters have been subjected to the process from S16 to S19. When not all the search characters have been subjected to the process from S16 to S19, the search procedure goes back to Step S12.

And then, as have been mentioned heretofore, the index matrix search processing portion 22a searches for the second search character in all the index matrices in the index information DB 17. When the second search character is detected successfully, the matching position and the character correlation values of the index matrices are stored. Next, the procedure goes to Step S15. And the search refinement is performed by repeating Steps S16 to S18, through which next character of the search keyword, that is, the third or following characters coming after the second search character, are searched for in all the index matrices including the second search character.

The index matrix search processing unit 22a also performs the search process as has been described heretofore, sequentially for the third and following search characters. To be specific, in the search process, a next search character is extracted in Step S19, index matrices including the extracted search character are taken out, and the taken-out index matrices are subjected to the search refinement for a search character which follows the search character included in the index matrices.

After all the search characters in the search keyword have been taken out in Step S19, the search procedure goes to Step S20. When it is determined in Step S20 that all the search characters have been subjected to the search process as have described heretofore, the search procedure goes to Step S21.

In Step S21, according to a reference of degree of correlation, the degree-of-correlation calculating portion 22c calculates the correction degree between the search keyword and the respective index matrices in the way as will be described later on.

And then, the search procedure goes to Step S22. In Step S22, the display order determining portion 22d determines a display order. The display order is so determined as to enable the display to begin from the document image including an index matrix of a high degree of correlation. Moreover, in Step S22, the document image extracting portion 22e acquires image data of document image from the document image DB 19 and the search result displaying portion 25 displays the document images in descending order of degree of correlations thereof.

Subsequently, referring to FIGS. 18 and 19, descriptions will be given to the methods for calculating a degree of correlation between index matrix and the search keyword in the degree-of-correlation calculating portion 22c, according to the reference of degree of correlation.

Search conditions are described in a block indicated by the reference numeral 101 in FIG. 18. For the sake of calculating the degree of correlation, a relative relationship is supposed between a certain search keyword and an index matrix. The relative relationship is described in the block indicated by the reference numeral 102. When the search keyword and the index matrix has the relative relationship as shown in the block 102 under the search conditions shown in a block 101, the degree of correlation between the search keyword and index matrix is calculated correspondingly according to a calculating formula as shown in a block 103.

Firstly, the search conditions in the block 101 are described. The number of characters in the keyword is set at R. The first search character is represented by C1, the second search character is C2, ..., and the R-th search character is Cr.

An index matrix to be searched is a matrix of M×N cells. That is to say, the number of image characters is M in the character string clipped as the heading region T, and the number of candidate characters is N selected in units of character in the character string.

A character correlation value is defined as a correlation value between a search character and respective candidates thereof. The correlation value is set in accordance with respective positions of the index matrix. Consequently, the character correlation values form a matrix of the same cells as that of the index matrix. That is to say, a matrix Weight of character correlation value is a matrix of M×N cells. For example, Weight[i][j] represents a character correlation value, when a candidate character positioned at [i, j](also represented by Index[i][j]) in the index matrix is found. In the present embodiment, as long as the column numbers [j] of the index matrix are the same, correlation values of character are the same, independently of row numbers [i].

When a search character is found in two adjacent rows in the index matrix, a degree-of-correlation weighting factor for rows Q is applied to a correlation value of characters in the two rows. When a search character is found in two adjacent rows, it is more likely to include two successively-positioned characters of the search keyword.

When the degree-of-correlation weighting factor for rows Q is set at a high value, a contribution to the degree of correlation calculated by the degree-of-correlation calculation portion 22c is high for the character correlation values of two rows successively in similarity and is low for the correlation values of nonadjacent respective rows becomes small. That is to say, when the degree-of-correlation weighting factor for rows Q is set at a high value, the search result is close correspondingly to the results obtained by searching for the whole vocabulary. Oppositely, when the degree-of-correlation weighting factor for rows Q is set at a low value, the search result is close to the results obtained by searching for the respective characters.

W1 represents the character correlation value corresponding to the search character C1, and W2 represents the character correlation value corresponding to the second search character C2, . . . , and Wr represents the character correlation value corresponding to the search character Cr.

Next, a description will be given to the supposed relative relationship between the search keyword and the index matrix shown in a block 102.

Between the search keyword and the index matrix, there exists a matching relationship between every search character C1, C2, . . . , Cr, and any one of the candidate characters in the index matrix. Matching positions of respective candidate characters matching the respective searching characters C1, C2, . . . , Cr are represented as [C1$i$, C1$j$], [C2$i$, C2$j$], . . . , [Cr$i$, Cr$j$].

Then, a further relative relationship is expressed by a formula (1) shown in the block 102, that is:

$$C(k+1)i = Cki+1, \; C(m+1)i = Cmi+1 \, (m>k) \quad (1)$$

where k and m represent relative positions of the respective search characters constituting the search keyword; C(k+1)i represents a row number of the index matrix of candidate characters which are in similarity with the (k+1)-th search character of the search keyword; and Cki represents a row number of index matrix of a candidate character matching the k-th search character of the search keyword.

Accordingly, C(k+1)i=Cki+1 represents that the row number in the index matrix of candidate characters which are in similarity with the (k+1)-th search character of the search keyword is identical to a 1-plus row number in index matrix of the candidate characters which are in similarity with the k-th search character of the search keyword. In other words, C(k+1)i=Cki+1 indicates the (k+1)-th search character and the k-th search character are in similarity in two adjacent rows in the index matrix, respectively.

The same goes for C(m+1)i=Cmi+1, which indicates the (m+1)-th search character and the m-th search character in the search keyword are found in two adjacent rows in the index matrix, respectively.

When the search keyword and the index matrix have the relative relationships as have been mentioned heretofore, the degree of correlation between the search keyword and the index matrix is calculated by a formula (2) shown in the block 103. The formula 2 is expressed by:

$$SimDegree = W1 + W2 + \ldots + W(k-1) + Q*(Wk + W(k+1)) + \quad (2)$$
$$\ldots + W(m-1) + Q*(Wm + W(m+1)) + \ldots + Wr$$

where W1 represents a character correlation value corresponding to the first search character C1, W2 represents a character correlation value corresponding to the second search character C2, and W(k−1) represents a character correlation value corresponding to the (k−1)-th search character C(k−1). Similarly, W(k) represents a character correlation value corresponding to the k-th search character Ck, and W(k+1) represents a character correlation value corresponding to the (k+1)-th search character C(k+1). In addition, W(m−1) represents a character correlation value corresponding to the (m−1)-th search character C(m−1) In the same way, W(Vn) represents a character correlation value corresponding to the m-th search character Cm, and the W(m+1) represents a character correlation value corresponding to the (m+1)-th search character C(m+1). Then, Wr represents a character correlation value corresponding to the r-th search character Cr.

In this way, the correlation value is calculated by accumulating the correlation values of all the search characters constituting the search keyword.

The k-th search character Ck and the (k+1)-th search character C(k+1) are found in two adjacent rows in the index matrix, respectively. Then, Q*(Wk+W(k+1)) in the formula (2) represents that the sum of the character correlation value Wk and the character correlation value W(k+1) is multiplied by the degree-of-correlation weighting factor for rows Q. It is the same in the case of Q*(Wm+W(m+1)).

Note that the (k−1)-th search character and the k-th search character are not found in two adjacent rows, and therefore both W(k−1) and Wk are not multiplied by the degree-of-correlation weighting factor for rows Q. It is the same in the case of W(m−1) and Wm.

In FIG. 18, however, the character correlation values of all the search characters from W1 to Wr are accumulated in the formula (2) because the search keyword and the index matrix shown in the block 102 are supposed to have such a relative relationship that every search characters C1, C2, . . . , Cr is in similarity with any one of candidate characters in the index matrix.

This is only one example and therefore, in the case where, for example, the search character C1 and the search character Cr have the relative relationship of formula (1) but are not in similarity with any candidate in the index matrix, the degree of correlation is calculated by the following formula:

$$\text{SimDegree} = W2 + \ldots + W(k-1) + Q*(Wk + W(k+1)) + \ldots + W(m-1) + Q*(Wm + W(m+1)) + \ldots + W(r-1)$$

which formula has less cumulative terms, naturally resulting in a decreased degree of correlation.

Further, in the case where every character C1, C2, ..., Cr is in similarity with any one of candidate characters in index matrix, and the (k+1)-th search character and the k-th search character of the search keyword, as well as the (k+2)-th search character and the (k+1)-th search character, are found in the two adjacent rows, respectively, the degree of correlation is calculated by the following formula:

$$\text{SimDegree} = W1 + W2 + \ldots + W(k-1) + Q*(Wk + W(k+1) + W(k+2)) \ldots + WR$$

In this case, the (k−1)-th search character and the k-th search character of the search keyword are not found in two adjacent rows. Therefore, both W(k−1) and Wk are not multiplied by the degree-of-correlation weighting factor for rows Q.

Next, a specific example is described on how to calculate the degree of correlation in reference to FIG. 19. Here, a degree of correlation is determined between the search keyword "神仙" and the index matrix (refer to Table 100) of the character string "去神仙居住的 地方" shown in FIG. 14.

Search conditions are shown in a block 104 of FIG. 19. Correlation value matrix Weight has M×N cells. The character correlation value is represented by Weight[i]=[1, 1−1/N, 1−2/N, ..., 1/N] (i=0, 1, ..., M−1). A degree-of-correlation weighting factor is represented by a symbol Q.

The search keyword "神仙" is divided into the first search character "神" and the second search character "仙". For each of the search characters, an index matrix is searched for a corresponding candidate character.

As will be known in reference to Table 100 in FIG. 14, the search character of "神" corresponds to [2, 2] and the search character of "仙" corresponds to [3, 1] in positions [i, j] of the index matrix.

Accordingly, as shown in a block 105, the character correlation value of the search character "神" is (1-1/N) and the character correlation value of the search character "仙" is 1.

The row number of the search character "神" is "2", and the row number of the search character "仙" is "3". As shown in Table 100 of FIG. 14, the two search characters are found in two adjacent rows in the index matrix, respectively.

Accordingly, as shown in a block 106, the character correlation value (1-1/N) of the search character "神" and the character correlation value 1 of the search character "仙" are multiplied by the degree-of-correlation weighting factor for rows Q. The degree of correlation between the search keyword "神仙" and the index matrix of the character string "去神仙居住的 地方" is thus determined by SimDegree=Q*((1−1/N)+1).

In the formula for determining the degree of correlation between search keyword and index matrix, parameters such as the weight (character correlation value) of the correlation value matrix and the degree-of-correlation weighting factor for rows Q can be adjusted in accordance with the user's requirements. Consequently, this enables a more ideal search result to be obtained.

By use of the keyboard 1 and the like, the user can, according to his requirements, set appropriately the parameters such as the weight (character correlation value) of the correlation value index and the degree-of-correlation weighting factor for rows Q.

In the index and the similarity measurement method according to image features as have been mentioned heretofore, index and search of multilingual document images can be satisfied and no character recognition is performed with reduced computational effort. The present invention can be applied to document images of not only Chinese but also various other languages.

Figure 20:
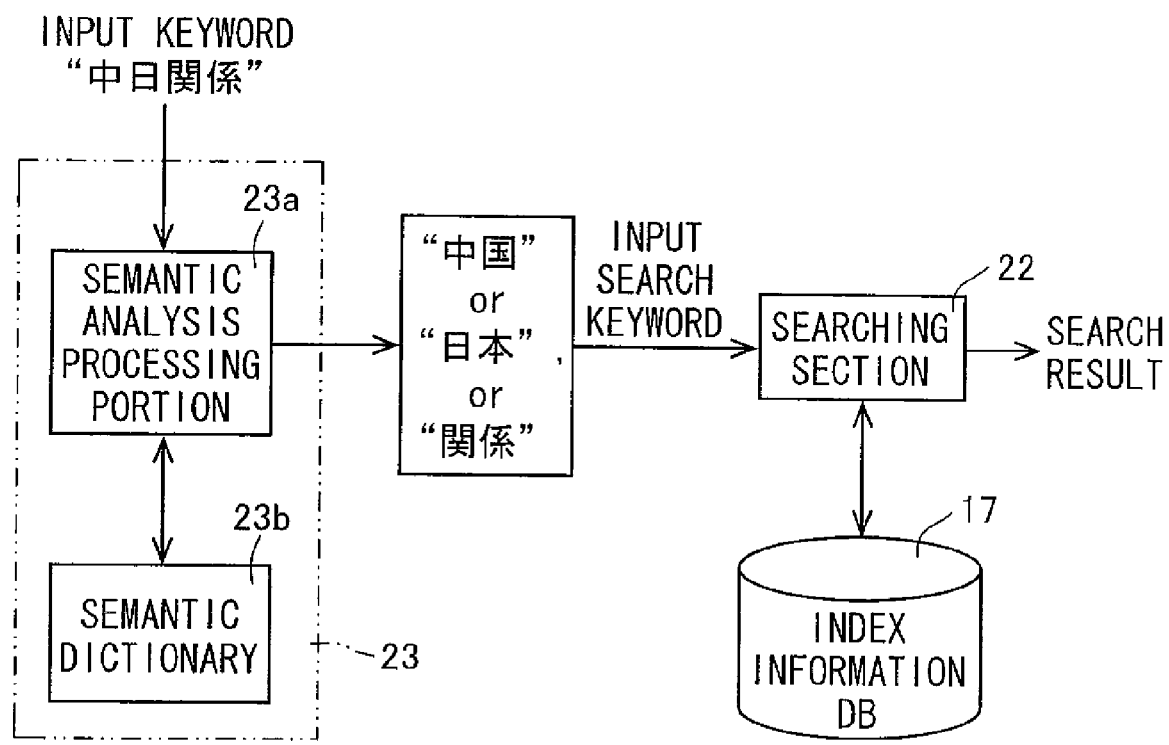
FIG. 20 is an illustration showing a search process provided with a lexical analysis function.

Subsequently, a description will be given to a search process having a lexical analysis function (a semantic analysis function). As also shown in FIG. 8B, in the document image processing apparatus 10 of the present embodiment, a lexical analyzing section 23 is provided between the keyword inputting portion 24 and the searching section 22. FIG. 20 shows a search process provided with the lexical analysis function.

The lexical analyzing section 23 is constructed of a semantic analysis processing portion 23a and a semantic dictionary 23b. When a search keyword is inputted from the keyword inputting portion 24, the semantic analysis processing portion 23a analyzes the meaning of the search keyword in reference to the semantic dictionary 23b.

For example, when "中日関係" is inputted as the search keyword, the semantic analysis processing portion 23a inputs to the searching section 22 three words relating to "中日関係", namely "中国", "関係", and "関係". The words "中国", "関係", and "関係" are treated respectively, so that "中国" or "関係", or "関係" is targeted as a search formula.

When the search formula, namely "中国" or "関係", or "関係", is inputted to the searching section 22, the searching section 22 searches the index information DB 17 and extracts document images including "中国", document images including "関係", or document images including "関係".

By doing so, not only document images including the search keyword but also document images related to the search word can be retrieved.

Next, a description will be given to the document image managing section 57 which performs a document image managing process. The document image managing section 57 is constructed of the character image feature extracting portion 14, the character image feature dictionary 15, the feature similarity measurement portion 16, the heading region initial processing portion 18, the document image DB 19, the document image feature DB 20, the document name preparing portion 51, the document image DB managing portion 52, the document image displaying portion 53, and the instruction inputting portion 54. Hereinbelow, the constituent portions constituting the document image managing section 57 will be described.

The description have already made on the functions of the character image feature extracting portion 14, the character image feature dictionary 15, the feature similarity measurement portion 16, the heading region initial processing portion 18, the document image DB 19, and the document image feature DB 20. Here, a description will be only given accordingly to the additional functions required for performing the document image managing process. Specifically, the document image managing process refers to preparing a meaning document name so as to mange the document images in the document image feature DE 20.

Figure 21:
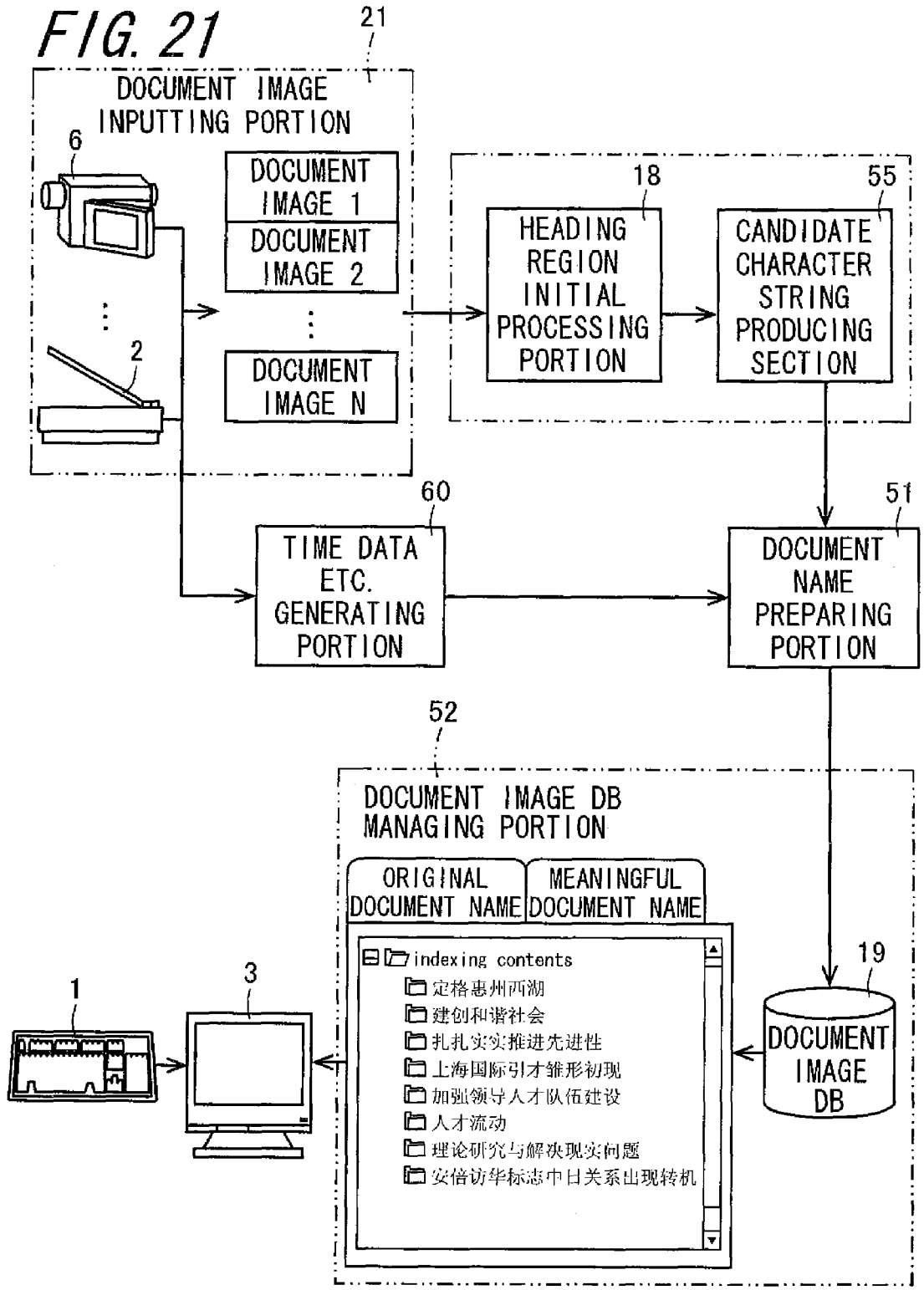
FIG. 21 is an illustration showing a process in a document image managing portion.

The document image managing process is described in reference to FIG. 21. The N pieces of document images, namely, the first document image through the N-th document image, are inputted from the document image inputting portion 21 which is constructed of the image scanner 2 or the digital photographic device 6.

The heading region initial processing portion 18 analyzes contents of the N pieces of respective document images thus inputted, and clips the heading regions to obtain character strings correspondingly. Next, although not illustrated in FIG. 21, the character image feature extracting portion 14, as mentioned above, divides the document images of the character strings included in the clipped heading regions into separated characters so as to extract image features of each of character images.

The candidate character string producing section 55 is constructed of the character image feature dictionary 15 and the feature similarity measurement portion 16. On the basis of the image features of images in the character strings clipped as has been described, the candidate character string producing section 55 selects characters having a high degree of similarity of image feature as candidate characters and prepares candidate character strings in accordance with the character strings included in the clipped heading regions. Simultaneously, the candidate character string producing section 55 adjusts the respective candidate characters constituting the candidate character strings by means of the lexical analysis method, so as to produce candidate character strings which make sense.

More specifically, based on the image features of character images extracted by the character image feature extracting portion 14, the candidate character string producing section 55 selects the N (N>1, integer) pieces of character images as candidate characters. The character images are selected from the character image feature dictionary 15 in descending order of degree of similarity of image feature. When the character number of the aforementioned string is M (M>1, integer), an index matrix of M×N cells is prepared. This process is performed by the aforementioned feature similarity measurement portion 16.

Next, on the basis of the prepared index matrix, the feature similarity measurement portion 16 prepares a candidate character string by sequentially arranging the first-column candidate characters of the respective rows of the prepared index matrix. And then, the semantic analysis is performed on the word composed of the candidate characters in the respective successive rows constituting the candidate string. And the first-column candidate characters in the respective rows are adjusted in such a manner as that the candidate character string has a meaning.

Figure 22:
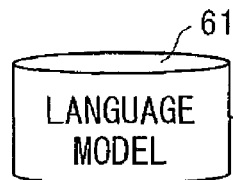
FIG. 22 is an illustration showing a specific example of a process on how to adjust a character string of the first column in the prepared index matrix into a character string which makes sense.

FIG. 22 is an illustration showing a specific example of index matrices before and after such an adjustment using the lexical analysis method and that the character string of the first column in the prepared index matrix is adjusted into a character string which makes sense.

The upper part of the FIG. 22 shows an index matrix 109 before adjustment. The index matrix 109 is the same as the index matrix shown in Table 100 of FIG. 14. In this state, the index matrix is stored in the index information DB 17. There is no meaning indicated by a candidate character string of "去神仙居住的 地方" formed according to the index matrix 109 as has been mentioned heretofore.

With respect to a candidate character string that can be used as the meaningful document name, the conjunction relationship between a subject, a predicate, and an object must be correct semantically. Consequently, by means of the lexical analysis, the aforementioned character string is converted into a candidate character string which makes sense. Specifically, by use of a conceptual dictionary, semantic information is analyzed between the plurality of error candidate characters and the other words in the candidate text, so that the candidate character string is revised to be a candidate character string which makes sense.

A language model 61 used in the lexical analysis as has been mentioned heretofore, may be one that provides statistical data of all prints starting from the Chinese character.

That is, according to main concepts of this language model 61, an automatic index system can be established technically. It is possible to obtain the statistical data on the script of news written in Chinese.

For example, as an implementation example, a Bi-gram model (language model) can be used. The Bi-gram is a biliteral, bisyllabic, or bilexical group. The Bi-gram is generally employed to a large extent, as the basis of simple statistical analysis of text. When shown by symbol series, each of symbol appearances is regarded as an independent event. The probability of the aforementioned symbol series is defined as will be described hereinbelow.

Note that the probability chain rule can be applied to the aforementioned function resolution. Chinese is regarded as an (N−1) order Markov chain (the probability of symbols is conditioned on previous appearance of the N−1 order symbol). This language character is referred to as an N-gram model.

The application of the established N-gram comprises statistical natural language processing which brings good results in a long period. The N-gram is composed commonly of statistics obtained by use of co-occurrence of characters and words in an entire text document of large size (i.e., corpus). The N-gram defines the establishment of the character chain or word chain. The N-gram has an advantage in its capability of covering a very large range of languages, compared to a common case where extraction is performed directly from the corpus. In the application to the language model, N is set at a value 2 to adopt the bi-gram model, in consideration of the limitation of computers and the properties of unlimited languages (characters and words exist indefinitely).

The lower part of FIG. 22 shows an index matrix 110 after adjustment. In the second row, the character "伸" located in the firth column, which is recognized as an error candidate, is replaced by a character "神" in the second column. Similarly, in the fifth row, the character "任" in the first column is replaced by the character "住" in the third column. And then, the character "酌" in the first column of the sixth row is recognized as an error candidate character in view of connection between the character "酌" and the words "居住" and "地方" which are placed before and after the character "酌".

In this way, the candidate character string included in the first column of the index matrix 110 becomes a character string of "去神仙居住的 地方" which makes sense. Note that the feature similarity measurement portion 16 may be so prepared as to store the index matrix 110 adjusted as has been described heretofore, in the index information DB 17 where the index matrix 110 is then stored.

Back to FIG. 21, the candidate character strings which have been produced to make sense by the candidate character string producing section 55 as has been described, are sent to the document name preparing portion 51.

The document name preparing portion 51 prepares a document name of the inputted document image, which document name includes the candidate strings that have been produced to make sense by the candidate character string producing section 55. The document name including the candidate character string which makes sense, is referred to as "meaningful document name" hereinbelow.

Into the document name preparing portion 51, other data are also inputted that represent an input time and an input route of the document image, from the time data etc. generating portion 60. The document name preparing portion 51 also can produce a file name by use of the other data including at least the time data inputted from the time data etc. generating portion 60.

For example, of the other data such as the time data, the time data are included in a meaningful document name. The meaningful document name may be composed of the time data and the meaningful candidate character string.

Alternately, by use of the other data such as the time data, another document name may be prepared for the same document image. A document name composed of the other data such as the time data, is referred to as an original document name hereinbelow.

By composing the document names as have been described heretofore, it is possible to manage one document image by a meaningful document name and an original document name composed of the other data such as time data.

Meaningful document names and original document names produced corresponding to respective document images are sent to the document image DB managing portion 52, and are further stored in the document image DB 19, with responsive image data corresponding to the document names.

When a user gives an instruction of browsing a document image by use of an instruction inputting portion 54 shown is FIG. 5B, composed of the keyboard 1 and the like, the document image DB managing portion 52 displays a browsing screen on the document image displaying portion 53 shown in FIG. 8B, composed of the display apparatus 3 and the like.

FIG. 23 shows one example of browsing screens, displayed by the document image displaying portion 53, of the document image stored in the document image DB 19.

A screen 201 shown on the left side of FIG. 23 shows a state where stored document images are displayed by a list of original document names thereof. An entry order of the respective document images is shown above the screen 201. A hithermost document image referred to as "AR C262M 20060803 103140" on the drawing sheet, is the document image inputted in the first place. Figures "20060803" represent that the input date is "Aug. 3, 2006". Figures "103140" represent that the input time is "10:31:40".

In the display state as has been described heretofore, an operation such as selecting a tag of meaningful document name displayed on the screen, causes a display of browsing screen to jump to a screen 202 shown on the left side of FIG. 23. The screen 202 shows a state where the stored document images are displayed by a list of the document names thereof.

The screen 202 corresponds to the screen 201, and also in the upper part of the screen 202, the hithermost document image referred to as a meaningful document name of "定格惠州西湖" is the document image inputted in the first place.

In this way, the document images can be browsed in accordance with the meaningful document names, thus enabling a user to manage or search the stored document images with ease. Moreover, by preparing meaningful document names in conjunction with the original names, information such as time data and file names can be seen simultaneously.

Additionally, in the present document image processing apparatus 10, index information is prepared by use of the prepared index matrix. The index information is applied to the search process. For this reason, the heading region initial processing portion 18 clips a plurality of heading regions T included in document images and prepares index matrices for the respective heading regions T. However, if only aiming to prepare meaningful names for the document images, it is not necessary to clip the plurality of headlines included in the document images and prepare the index matrices for the respective clipped headlines.

That is, the document image processing apparatus may be so configured: preparing an index matrix for a character string of headline (character image string) included in a heading region which describes the document image the most aptly; and on the basis of this, employing a character string which is in similarity with the feature of the document image, to prepare a name which has a meaning.

The headline existing on the top row of the document image, for example, can be adopted as the heading region that describes the document image very aptly. This is due to that an important headline is inclined to be aligned on the top row of the document image correspondingly.

The size of the characters included in the heading region can be set to be greater than a certain size threshold and can be set to be greater than characters included in the other clipped heading regions. This is due to that compared to the other headlines, an important headline is inclined to be described in greater character size.

Alternately, the font type of the characters included in the heading region can be set different from those of the characters included in the other clipped heading regions. This is due to that an important headline is inclined to be described by characters having a font type different from that of characters included in the other headlines. Note that other standards other than the aforementioned ones can also be added. Further, the respective standards may be used either individually or in combination.

In addition, as in the case of the present document image processing apparatus 10, a document image processing apparatus may be constructed as to clip a plurality of heading regions from one document image and prepare index matrices for the respective heading regions thereof. In the constitution, the index matrix of the most important headline may be specified by the placement position of the heading region, the character size, or the character font. Moreover, particularly, being in this case, it is also preferable that a candidate character string be prepared so as to include a word which appears most frequently, based on the index matrices of the plurality of clipped heading regions.

Finally, a hardware logic circuit may be used to constitute respective blocks of the document image processing apparatus 10, particularly the character style normalization processing portion 12, the character image feature extracting portion 14, the feature similarity measurement portion 16, the heading region initial processing portion 18, the searching section 22, the lexical analyzing section 23, the document name preparing portion 51, the document image DB managing portion 52, and the like. Moreover, the aforementioned blocks may be realized by software by use of CPU, which will be described as follows.

That is, the document image processing apparatus 10 is provided with a central processing unit (abbreviated as CPU) for implementing a control program direction for realizing all the functions, a read-only memory (abbreviated as ROM) where the aforementioned program is stored, a random access memory (abbreviated as RAM) for developing the aforementioned program, a storage device which stores memory for storing the aforementioned program and all types of data and the like, and the like devices. And then, the object of the present invention can be achieved also by the following process: providing a recording medium recorded computer-readably with program codes to the aforementioned document image processing apparatus 10; and reading out, by means of the computer (or CPU or MPU), the program codes recorded on the recording medium. The recording medium records computer-readably program codes (executable format program, intermediate code program, and source program) of the control program of the document image processing apparatus 10. The control program is software to realize the aforementioned functions.

The aforementioned recording medium may be, for example, selected from a group including a tape recording medium, a disk recording medium, a card recording medium, and a semiconductor memory recording medium. The tape recording medium includes a magnetic tape or a cassette tape. The disk recording medium includes a magnetic disk such as a floppy (registered trademark) disk or a hard disk, and an optical disk such as CD-ROM, MO, MD, DVD, or CD-R. The card recording medium includes an IC card (including memory card) and an optical card. The semiconductor memory recording medium includes mask ROM, EPROM, EEPROM, and flash ROM.

Further, the document image processing apparatus 10 may be so configured as to be connectable to communication network through which the aforementioned program codes can be provided. The communication network which is not particularly limited, may be selected, for example, from a group including Internet, intranet, extranet, LAN, ISDN, VAN, CATV communication network, virtual private network, telephone line network, mobile communication network, satellite communication network, and the like. A transmission medium is not particularly limited, which may be either wired or wireless. The wired medium includes IEEE1394, USB, power-line carrier, cable TV line, telephone line, ADSL line, and the like. The wireless medium includes IrDA or remote infrared light, Bluetooth (registered trademark), 802.11 wireless network, HDR, a cellular phone network, a satellite connection, digital terrestrial network, and the like. In addition, the present invention can be realized also by using computer data signal embedded in the carrier wave, which is realized by electronic transmission of the aforementioned program codes.

The invention may be embodied in other specific forms without departing from the spirit or essential features thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A computer-implemented character image extracting method comprising:
    an extracting step for obtaining a linked component composed of a plurality of mutually linking pixels from a character string region composed of a plurality of characters and extracting section elements from the character string region, the section elements each being surrounded by a circumscribing figure circumscribing the linked component;
    a first altering step for altering the section elements extracted in the extracting step into new section elements, by determining which respective section elements among the section elements extracted in the extracting step have at least mutually overlapping circumscribing figures, and combining the determined respective section elements to form a new section element, while setting remaining section elements thereof as other new section elements without being combined;
    a first selecting step for selecting, from among the section elements altered in the first altering step, section elements having a size greater than a predetermined reference size;
    a second altering step for altering the section elements selected in the first selecting step into new section elements by combining the section elements of the section elements selected by the first selecting step that are smaller in dimension in a character alignment direction than a predetermined first reference dimension and that are adjacent to each other in the character alignment direction to form a new section element, while setting remaining section elements thereof as other new section elements without being combined; and
    a second selecting step for selecting, of the section elements altered by the second altering step, section elements that are greater in dimension in a character alignment direction than a predetermined second reference dimension.

2. The computer-implemented character image extracting method of claim 1 further comprising:
    a dividing step for dividing, of the section elements selected in the second selecting step, section elements that are greater in dimension in the character alignment direction than a predetermined third reference dimension, based on the third reference dimension.

3. A character image extracting apparatus comprising:
    an extracting unit for obtaining a linked component composed of a plurality of mutually linking pixels from a character string region composed of a plurality of characters and extracting section elements from the character string region, the section elements each being surrounded by a circumscribing figure circumscribing the linked component;
    a first altering unit for altering the section elements extracted by the extracting unit into new section elements, by determining which respective section elements among the selection elements extracted by the extracting unit have at least mutually overlapping circumscribing figures, and combining the determined respective section elements to form a new section element, while setting remaining section elements thereof as other new section elements without being combined;
    a first selecting unit for selecting, from among the section elements altered by the first altering unit, section elements having a size greater than a predetermined reference size;
    a second altering unit for altering the section elements selected by the first selecting unit into new section elements by combining the section elements of the section elements selected by the first selecting unit that are smaller in dimension in a character alignment direction than a predetermined first reference dimension and that are adjacent to each other in the character alignment direction to form a new section element, while setting remaining section elements thereof as other new section elements without being combined; and
    a second selecting unit for selecting, of the section elements altered by the second altering unit, section elements that are greater in dimension in a character alignment direction than a predetermined second reference dimension.

4. A non-transitory computer-readable recording medium on which is recorded a character image extracting program for causing a computer to perform a character image extracting method, comprising:
    an extracting step for obtaining a linked component composed of a plurality of mutually linking pixels from a character string region composed of a plurality of characters and extracting section elements from the character string region, the section elements each being surrounded by a circumscribing figure circumscribing the linked component;
    a first altering step for altering the section elements extracted in the extracting step into new section elements, by determining which respective section elements among the section elements extracted in the extracting step have at least mutually overlapping circumscribing figures, and combining the determined respective section elements to form a new section element, while setting remaining section elements thereof as other new section elements without being combined;

a first selecting step for selecting, from among the section elements altered in the first altering step, section elements having a size greater than a predetermined reference size;

a second altering step for altering the section elements selected in the first selecting step into new section elements by combining the section elements of the section elements selected by the first selecting step that are smaller in dimension in a character alignment direction than a predetermined first reference dimension and that are adjacent to each other in the character alignment direction to form a new section element, while setting remaining section elements thereof as other new section elements without being combined; and a second selecting step for selecting, of the section elements altered by the second altering step, section elements that are greater in dimension in a character alignment direction than a predetermined second reference dimension.

* * * * *